United States Patent [19]

Oswald et al.

[11] 3,907,852

[45] Sept. 23, 1975

[54] SILYLHYDROCARBYL PHOSPHINES AND RELATED COMPOUNDS

[75] Inventors: Alexis A. Oswald, Mountainside; Lawrence L. Murrell, Elizabeth, both of N.J.

[73] Assignee: Exxon Research and Engineering Company, Linden, N.J.

[22] Filed: June 23, 1972

[21] Appl. No.: 265,507

[52] U.S. Cl. ............... 260/448.2 N, 260/448.2 D, 260/448.2 E; 260/448.8 R; 260/429 R; 260/439 R; 260/438.5 R; 252/431 N; 252/431 P; 423/659
[51] Int. Cl.² .... C07F 7/02; C07F 7/08; C07F 7/10; C07F 7/12
[58] Field of Search ............ 260/448.2 N, 448.2 E, 448.8 R

[56] References Cited
UNITED STATES PATENTS

| | | | |
|---|---|---|---|
| 2,823,218 | 2/1958 | Speier et al. | 260/448.2 E |
| 2,970,150 | 1/1961 | Bailey | 260/448.8 R X |
| 3,067,229 | 12/1962 | Fekete | 260/448.2 N |
| 3,122,581 | 2/1964 | Pike | 260/448.8 R |
| 3,501,403 | 3/1970 | Jacques et al. | 260/448.2 N X |
| 3,726,809 | 4/1973 | Allum et al. | 260/448.2 N X |

*Primary Examiner*—Paul F. Shaver
*Attorney, Agent, or Firm*—Joseph J. Allocca

[57] ABSTRACT

Novel heterogeneous silylhydrocarbyl phosphine transition metal complex catalysts and intermediates therefore are prepared by (a) the selective monoaddition of silanes having chlorine, alkoxy or acyloxy groups to an $\alpha,\omega$-diene (b) followed by the addition of a phosphine to the resulting $\omega$-alkenyl silanes to form the corresponding silylalkyl phosphines (c) which are then covalently anchored as such or in the form of their transition metal complexes via condensation of their reactive silane substituents with hydroxy groups of silica and metal oxides, (d) optionally followed by complexing the free phosphine groups of anchored silylalkyl phosphines with transition metal compounds.

24 Claims, No Drawings

SILYLHYDROCARBYL PHOSPHINES AND RELATED COMPOUNDS

This invention relates to a novel method of anchoring phosphine complexes of transition metals to inorganic solids such as silica for the production of novel catalysts.

The novel method of anchoring is based on the known ability of certain silane compounds to react with the hydroxyl groups of silica and the like (see Plastic Report 18 entitled "Glass/Resin Interface: Patent Survey, Patent List, and General Bibliography," Office of Technical Services, Department of Commerce). The complexing reactions of simple hydrocarbon phosphines with transition metals are also known as well as the use of such complexes in catalysis. (For reference see the monograph of Juergen Falbe, "Carbon Monoxide in Organic Synthesis," Springer-Verlag, New York, 1970).

The present invention chemically links the reactive silane group and the complex forming phosphine group via a divalent hydrocarbon radical. Such bridged silaphosphines are then anchored and complexed with transition metals to derive new types of catalysts. These catalysts are insoluble and as such, are free from the catalyst recovery problems commonly experienced with the known soluble complexes of phosphines.

In the subsequent detailed discussion of our invention, the synthesis of substituted silylalkylphosphine anchoring agents via silane-diene monoaddition followed by phosphine addition will be considered at first. Anchoring reactions with silica and the like and complexing with transition metals will be described thereafter. Finally, novel processes using the anchored catalysts will be discussed.

1. ADDITION OF SILANES TO THE $\alpha,\omega$-DIENES

The addition of silanes, containing the reactive Si—H functionality, to monoolefins is well known. For reference, see the monograph by C. Eaborn entitled "Organosilicon Compounds," Academic Press, New York, 1970, pages 45–64. However, the addition of silanes to $\alpha,\omega$-dienes is complicated by the tendency of terminal vinylic groups to isomerize into internal olefinic groups during the addition.

It was found in the present invention that silanes can be added selectively to $\alpha,\omega$-dienes in a selective terminal manner to yield novel $\omega$-alkenyl silane monoadducts and bis-$\alpha,\omega$-silyl alkanes.

The silane reactants are preferably of the general formula:

$$R_{4-y}SiH_y$$

wherein R is chlorine; $C_1$ to $C_4$ alkoxy such as methoxy, ethoxy, propoxy; $C_1$ to $C_4$ acyloxy such as acetoxy; R can also be a $C_1$ to $C_6$ hydrocarbyl such as phenyl, methyl providing that at least one of the R groups is a reactive chlorine, alkoxy or acyloxy group; y is 1 and 2.

The $\alpha,\omega$-diene reactants of the present invention are of the general formula:

$$CH_2=CH(CH_2)_kCH=CH_2$$

wherein k is 1 to 30, preferably 1 to 10, more preferably 1 to 4, most preferably 4.

Exemplary reactants are trichlorosilane, triethoxysilane, triacetoxysilane, methyldichlorosilane, phenylchlorosilane, 1,4-pentadiene, 1,21-docosadiene, 1,13-tetradecadiene.

It was found that these reactants yield selectively $\omega$-alkenyl silanes and bis-$\alpha,\omega$-silyl alkanes according to the following schemes:

$$R_{4-y}SiH_y + y\ CH_2=CH(CH_2)_kCH=CH_2 \rightarrow R_{4-y}Si[(CH_2)_lCH=CH_2]_y$$

wherein y is 1 and 2 and l is $k + 2$ and $$R_3SiH + CH_2=CH(CH_2)_kCH=CH_2 \rightarrow R_3Si(CH_2)_lCH=CH_2 + R_3Si(CH_2)_mSiR_3$$

wherein m is $k + 4$.

Such additions are preferably carried out in the liquid phase in the presence of free radical and/or metal and/or metal salt catalysts. Exemplary free radical catalysts are radiation such as ultraviolet light and gamma rays, chemicals such as peroxide compounds and azo compounds and thermal catalysis by heating. Exemplary metal catalysts are for example, platinum, palladium, usually on either asbestos or, alumina or charcoal. Illustrations for metal salt catalysts are potassium chloroplatinate, chloroplatinic acid, ruthenium chloride. These metal salts can be also used as their complexes, for example with trihydrocarbyl phosphines.

The temperature of these additions may vary from $-90°$ to 200°C, preferably $-90°$ to 90°C, most preferably from $-90°$ to 30°C. The temperature may be critical with regard to selective monoaddition to yield $\omega$-alkenyl silanes.

The ratio of the reactants may vary from 0.5 to 6 moles of diolefin per mole of silane. It is, however, preferred for a selective monoaddition to use 2 to 6 moles of diolefin per mole of silane.

The additions are carried out to a substantial conversion and the products are then isolated usually by fractional distillation.

The $\omega$-alkenyl silane monoadducts have properties unexpectedly different from the known vinyl and allyl silanes of analogous structure. The chloro derivatives are more reactive in Ziegler-type polymerization. These terminally unsaturated compounds behave also very differently from their internally unsaturated isomers. The terminal olefinic group of these compounds, for example, is reactive towards phosphine adding agents while the internal compounds are inert.

The bis-$\alpha,\omega$-silyl alkanes are useful as cross-linking reagents due to their diterminal functionality. As such they may find particular applications in adhesives, mastics and the like.

2. ADDITION OF PHOSPHINES TO ALKENYL SILANES

The addition of phosphines to vinylsilanes has been extensively studied by H. Niebergall. (See Makromolekulare Chemie, Volume 52, pages 218–229, which was published in 1962). He has found that diethyl phosphine reacts with divinyl dichlorosilane as shown by the following reaction schemes:

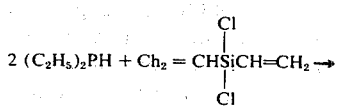

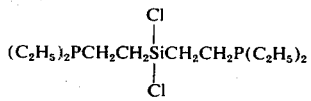

$2 (C_2H_5)_2PH + Cl_2Si(CH=CH_2)_2 \rightarrow$ $(C_2H_5)_2\underset{Cl}{PSi}(CH=CH_2)_2 + [(C_2H_5)_2\overset{+}{PH_2}]Cl^-$ Niebergall reported that both of the above reactions occur under free radical conditions.

In the present work, it was surprisingly found that in the reaction of phosphines with ω-alkenyl silanes, the formation of P—Si bonds can be avoided. As such the reaction could be used, preferably under mild conditions, for the synthesis of novel ω-silylalkyl phosphines.

The phosphine adding agent is of the general formula:

$$R'_{3-x}PH_x$$

wherein R' is a $C_1$ to $C_{30}$ hydrocarbyl radical selected from the group consisting of alkyl, cycloalkyl, phenylalkyl, phenyl, alkylphenyl. R' is preferably $C_1$ to $C_{30}$ alkyl, cyclohexyl and phenyl, most preferably $C_1$ to $C_4$ alkyl, cyclohexyl and phenyl. The symbol $x$ stands for numbers 1–3, preferably 1, 2.

The ω-alkenyl silane reactants are of the general formula:

$$R_{3-y}Si[(CH_2)_lCH=CH_2]_y$$

wherein the meaning of the symbols is the same as in part 1 of the disclosure.

The reaction of the above phosphines with the ω-alkenyl silanes according to the present invention involves only the P—H and $CH_2=CH$-Si groups as shown by the following reaction equation:

$$R'_{3-x}PH_x + [CH_2=CH(CH_2)_l]_ySiR_{4-y} \rightarrow (R'_{3-x}P)_z[(CH_2)_m]_ySiR_{4-y}$$

wherein the meaning of old symbols is the same as before. The new symbol $z$ is a number from 1–3. The value of $z$ is, of course, selected so as to satisfy the valence relationships.

Preferred additions and compositions are those wherein $x$ and $y$ are 1 and 2, for example $R'_2PH + CH_2=CH(CH_2)_lSiR_3 \rightarrow R'_2P(CH_2)_mSiR_3$
$R'PH_2 + 2CH_2=CH(CH_2)_lSiR_3 \rightarrow R'P[(CH_2)_mSiR_3]_2$ Specifically preferred are ω-alkenyl chlorosilane reactants and compositions resulting therefrom, e.g.

$$R'_2PH + CH_2=CH(CH_2)_lSiCl_3 \rightarrow R_2P(CH_2)_mSiCl_3$$

The desired anti-Markovnikov-type reaction is initiated by the use of free radical catalysts such as radiation and/or chemical initiators. Initiation by radiation includes gamma rays and ultraviolet light. Typical chemical initiators are azo compounds such as azo-bis-isobutyronitrile. The use of irradiation and its combination with chemical initiation are preferred over the use of chemical initiation alone. Radiation means of initiation allow the use of low reaction temperatures.

The temperature of the reaction is between − 105° and + 100°C, preferably between −100° and +16°C, most preferably between −80° and 0°C. The highest allowed reaction temperature is largely dependent on the basicity of the phosphine used. The more basic dialkyl phosphines have a higher tendency to undergo undesirable side reactions involving the chlorosilane groups.

The reaction is to be carried out in the liquid state. This means that the process is normally atmospheric. In the case of phosphines which are normally gaseous at the reaction temperature, such as methylphosphine, superatmospheric pressures up to 20 atmospheres may be used to keep the reactants in the liquid phase.

The reaction is usually carried out without added solvents. At times, however, nonreactive solvents can be advantageously used. Preferred solvents include ketones such as methyl ethyl ketone, ethers and thioethers such as dipropyl sulfide, aliphatic and cycloaliphatic hydrocarbons such as cyclohexane, aromatic hydrocarbons and their halogenated derivatives such as chlorobenzene.

The ratio of reactants is not critical. The reactants are usually employed in equivalent quantities. However, it is preferred to have 0.3 to 6 moles of phosphine per mole of alkenyl silane. In the case of monofunctional reactants, the use of 1.5 to 2.5 mole of phosphine per mole of alkenyl silane is preferred.

The addition reactions are preferably run to a 20 to 90% conversion of the phosphine. The preferred conversion is in excess of 50%. High reactant conversions can be important for avoiding undesired side reactions. At the completion of the reaction, the unreacted components are removed, usually by vacuum stripping. The products can be purified, preferably by fractional distillation in vacuo.

3. SILYLHYDROCARBYL PHOSPHINE — TRANSITION METAL COMPLEXES

It was found in the present invention that transition metal salts complex with silyhydrocarbyl phosphines of the general formula:

$$(R'_{3-x}P)_zQ_ySiR_{4-y}$$

wherein Q is $C_1$ to $C_{30}$ hydrocarbylene such as phenylene, xylylene, terphenylene, preferably $(CH_2)_p$ with $p$ being 1–30 more preferably p equals 5–30, most preferably 8. The meaning of the other symbols is the same as listed in the previous part of this specification. In effect one of the preferred formula of the silylhydrocarbyl phosphines is as listed there $$(R'_{3-x}P)_z[(CH_2)_m]_ySiR_{4-y}$$

Compounds of the above and similar more preferred formula react with transition metal compounds such as those of Groups VI, VII and VIII, e.g. of Fe, Ru, Os, Rh, I, Ni, Co, Pd and Pt of the formula $$MX_n$$

wherein M is the metal, X is an anion such as chlorine, bromine, acetate or organic ligand which satisfy the coordination sites of the metal; $n$ is 2 to 6.

Preferred metal compounds contain a readily displaceable organic ligand such as carbonyl, diolefin, tetrahydrofuran, acetylacetonate. Other preferred metal compounds are capable of raising their coordination number, e.g. nickel-1,5,9-cyclododecatriene.

In a most general way, the novel silylhydrocarbyl phosphine-transition metal complexes can be defined by the following formula:

$$[(R'_{3-x}P)_zQ_ySiR_{4-y}]_gO(MX_n)_s$$

wherein $g$ is 1 to 6, $s$ is 1–3.

For the purposes of discussing the metal complex formation with silylhydrocarbyl phosphines, compounds having $x$, $y$, $z$ equal 1 are selected for illustration, e.g.

$R'_2PQSiR_3$ and $R'_2P(CH_2)_mSiR_3$

These compounds and the like are designated L, as monophosphines of a particular structure.

The transition metal complexes may contain various numbers of phosphine ligands as indicated by the formula:

$$L_roMX_n$$

wherein $n$ and $r$ are 1–6 providing that $n + r$ is 2 to 6, preferably 6.

A preferred example of these metal complexes can be formed from diene-rhodium chloride complex dimers such as that of 1,5-cyclooctadiene i.e. 1,5-COD:

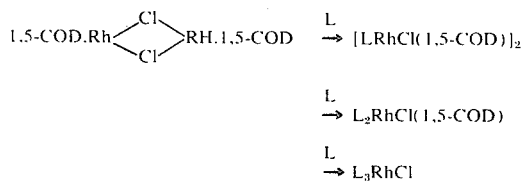

As indicated by the above scheme, the structure of the complexes is dependent on the ratio of the reactants. In general, no reactant is to be used above the stochiometric quantity.

The complexing reactions are usually dependent on the temperature used. Of course, the practical temperatures are below the decomposition temperature of the complex formed. The temperature is preferably in the range of $-90°$ to $200°C$.

The reactions are preferably carried out in the liquid phase in the presence of inert solvents. Hydrocarbons such as paraffins, aromatics and their chlorinated derivatives may be used. Ethers such as tetrahydrofuran can be also suitable. Reactions using volatile transition metal compounds much as nickel tetracarbonyl can be also carried out in the vapor phase.

The novel complexes are usually soluble in hydrocarbons and can be used in solutions. However, they can be also isolated by crystallization or the removal of the solvent by distillation.

4. ANCHORING OF SILYLHYDROCARBYL PHOSPHINES AND TRANSITION METAL COMPLEXES THEREOF

The novel phosphine ligands of the present invention and their metal salt complexes can be reacted with the hydroxyl groups of solid, insoluble inorganic compositions, such as those present on the surface of dehydrated silica and metal oxides. These hydroxyl group may be covalently bound to silicon or aluminum or may come from coordinatively bound surface water. Whatever their exact bonding may be, reaction of these hydroxyl groups with the chlorosilane groups of the phosphine ligand occurs with the formation of HCl.

Materials which contain or can be made to contain free silanol, i.e. Si—OH groups include various forms of diatomaceous earth, e.g. the well known chromosorbs in gas liquid chromatography, silica gels, silica beads, glass beads.

The anchoring reactions of the reactive silane functions of the present phosphines establish a silicon oxygen bond is indicated by the following schemes:

Si—Cl + HO—≣ → Si—O—≣ + HCl

Si—OR'' + HO—≣ → Si—O—≣ + ROH
Si—OCOR''' + HO—≣ → Si—O—≣ + RCO$_2$H wherein R'' is a $C_{1-4}$ alkyl and R''' is a $C_{1-3}$ alkyl or hydrogen.

Since the silyl groups of our phosphines may contain 1 to 3 of the above reactive groups, more than one of them may react per molecule. Concurrent with the anchoring or preferably subsequently some of these reactive groups may be hydrolyzed by water which converts them to silanol groups. The latter may undergo siloxane type condensation, e.g.

2 Si—OH → Si—O—Si + H$_2$O

The general scheme of anchoring can be depicted by the following scheme:

$(X_nM)_t[(R'_{3-z}P)_zQ_yS iR_{4-y}]_g + (HO)_{\overline{y}}\equiv \rightarrow$
$(X_nM)_t[(R'_{3-z}P)_zQ_yS iR_{3-y}—O]_y \equiv$ wherein $t = 0-3$.

The anchoring reaction results in the formation of Si-O bonds as illustrated by the following example:

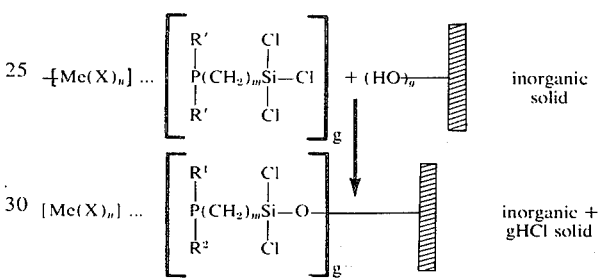

The anchoring reaction can be carried out in a broad temperature range from $-50°$ to $+400°C$, preferably from $-20°$ to $200°C$. In the case of dehydrated silica it was surprisingly found that anchoring occurs at low temperatures in the order of $-50°$ to $+50°C$.

The anchoring reactant is best applied in a solvent. It can be used by impregnation onto silica. In the case of dehydrated silica or undehydrated silica, about one silyl group can be anchored per 50 A$^2$ of the surface. This corresponds to a complete surface coverage. For the present silylhydrocarbyl phosphines, it is preferred to have less than about 50% surface coverage in order to derive more effective catalysts.

If the anchoring is carried out with the silylhydrocarbyl phosphines, complexing with the transition metal compounds can be carried out subsequently. The anchored phosphines undergo complex formation with transition metal compounds in the same manner the non-anchored parent phosphines do.

5. PROPERTIES OF ANCHORED SILYLHYDROCARBYL PHOSPHINES AND TRANSITION METAL COMPLEXES THEREOF

The anchored phosphines of the present invention may be used in the field of separations for reversible complexing with acids, metal salts and the like.

The metal complexes of the anchored phosphines represent a novel type of catalysts. These anchored catalysts act in the same manner soluble organometallic catalysts do. They catalyze the same reactions. However, due to their insolubility our catalysts are suited for continuous operations. Catalyst losses can be drastically reduced using our anchored complexes. Another advantage of anchoring resides in the potentially increased stereoselectivity of our catalysts. The approach of reactants to the anchored complex catalyst can occur only from the non-anchored side.

For reference on transition metal phosphine complex catalysts see "Homogeneous Catalysis," No. 70 in the Advances in Chemistry Series of the American Chemical Society and a monograph by J. P. Candlin, K. A. Taylor and D. P. Thompson entitled "Reactions of Transition Metal Complexes," Elsevier, New York, 1968.

ω-Trichlorosilylalkyl phosphine-rhodium complexes with different polymethylene chain lengths have differing catalytic activity. For example, $L_3RhCl$ complexes where L represents an anchored phosphine with a dimethylene bridge, is not a hydroformylation catalyst, whereas where L is a $C_8$ or $C_{14}$ polymethylene chain, the $L_3RhCl$ catalyst is an active hydroformylation catalyst. Further, the (1,5-cyclooctadiene) LRhCl complex where L represents an anchored phosphine with dimethylene bridge is also not a hydroformylation catalyst, whereas where L is a $C_8$ or $C_{14}$ polymethylene chain, the (1,5-cyclooctadiene)LRhCl complexes are active hydroformylation catalysts.

Anchored catalysts can be repeatedly recycled from a batch catalytic reaction without loss in catalytic activity. For example, $L_3RhCl$ where L represents an anchored phosphine with a $C_8$ methylene chain showed no decrease in hydrogenation activity after being repeatedly recycled.

It can be concluded that metal loss from these novel heterogeneous catalysts is not observed under corrosive solvent and severe reaction conditions. For example, rhodium metal is not lost from the anchored complex $L_2Rh(CO)Cl$ where L is an anchored phosphine with a $C_2$ methylene chain after treatment for two hours with concentrated acetic acid at 150°C. Also, as example, rhodium metal is not lost from the above $L_2Rh(CO)Cl$ complex following methanol carbonylation reaction conditions of 175°C for greater than 15 hours.

SYNTHESIS OF ALKENYL SILANES

Example 1 — Addition of Trichlorosilane to 1,7-Octadiene in the Presence of Chloroplatinate

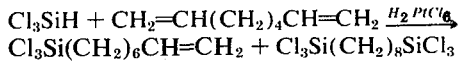

$Cl_3SiH + CH_2=CH(CH_2)_4CH=CH_2 \xrightarrow{H_2PtCl_6}$
$Cl_3Si(CH_2)_6CH=CH_2 + Cl_3Si(CH_2)_8SiCl_3$ A. To a stirred mixture of 27.1 g (0.2 mole) trichlorosilane and 66 g (0.6 mole) 1,7-octadiene in a round bottom flask, is added 0.1 ml of a 10% ethanolic solution of 40% hexachloroplatinic acid. The reaction mixture was heated up to 130°C. and kept there for 28 hours to complete the addition. Thereafter, the mixture was fractionally distilled to obtain 49 g, i.e., 70 % yield of the 8-octenyl trichlorosilane monoadduct as a colorless liquid boiling between 51°–53° at 0.3 mm and 6 g of the 1,8-bis-trichlorosilyloctane diadduct as a distillation residue.

Analyses: Calcd. for the monoadduct, $C_8H_{17}SiCl_3$: C, 39.11; H, 6.16; Cl, 43.35. Found: C, 39.34; H, 5.72; Cl, 42.44.

A proton magnetic resonance (nmr) spectrum of the product shows the characteristic complex resonance signals of the terminal —CH=CH₂ group.

B. A mixture of 108.4 g (0.8 mole) trichlorosilane and 264 g (2.4 mole) 1,7-octadiene was similarly reacted after the addition of 0.4 ml 10% ethanolic solution of 40% chloroplatinic acid by heating the mixture at 50°C for 44 hours. A subsequent fractionation in vacuo yielded 154 g, i.e. 80 % of the monoadduct and 20 g, i.e. 10 % of the diadduct as a colorless liquid distilling at 123°–125° at 0.4 mm pressure.

Analyses: Calcd. for the diadduct, $C_8H_{16}Si_2Cl_6$: C, 25.21; H, 4.23; Cl, 55.82. Found: C, 24.71; H, 4.00; Cl, 54.64.

An nmr spectrum of the product shows only CH₂ absorptions, indicating a straight chain octamethylene structure.

C. In another experiment, 220 g (1.62 mole) trichlorosilane was added slowly in 20 minutes to a stirred mixture of 660 g (6mole) 1,7-octadiene at 35°C. Subsequently, the reaction mixture was heated at 50°C. for 24 hours to complete the addition and then fractionally distilled. This resulted in 322 g, i.e. 82%, 7-octenyl trichlorosilane and 24 g, i.e. 12%, 1,8-bis-trichlorosilyl octane.

D. When 0.015 ml of the ethanolic chloroplatinic acid was added to a mixture of 3.4 g (0.025 mole) trichlorosilane and 5.5 g (0.05 mole) 1,7-octadiene and the reaction mixture heated at 50°C for 18 hours, a similar addition took place without a double bond isomerization.

E. Similarly, addition without isomerization occurred when the above reactant mixture was allowed to stand at ambient temperature in the presence of 0.015 ml added 10% isopropanol solution of 40% chloroplatinic acid as a catalyst.

Example 2 — Addition of Methyldichlorosilane to 1,7 Octadiene in the Presence of Chloroplatinate

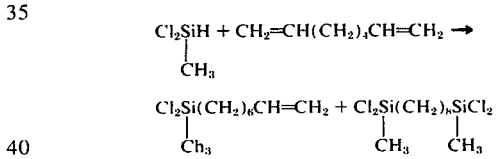

$Cl_2SiH + CH_2=CH(CH_2)_4CH=CH_2 \rightarrow$
  |
  $CH_3$ $Cl_2Si(CH_2)_6CH=CH_2 + Cl_2Si(CH_2)_8SiCl_2$
  |                              |        |
  $CH_3$                        $CH_3$  $CH_3$ To a stirred mixture of 96.6 g (0.84 mole) methyldichlorosilane and 277.2 g (2.5 mole) 1,7-octadiene, 4 ml 10% ethanolic solution of 40% chloroplatinic acid was added as a catalyst. The addition of the catalyst resulted in an exothermic reaction. As a result, the temperature of the reaction mixture rose to 115°C in 12 minutes. After the reaction subsided the crude product was fractionally distilled to yield 132 g (70%) 7-octenyl methyldichlorosilane, bp. 50°–52°C at 0.1 mm and 21 g (14%) 1,8-bis-trichlorosilyl octane, bp. 125°–6°C at 0.2 mm.

Analyses Calcd. for the monoadduct, $C_9H_{18}SiCl_2$: C, 47.99; H, 8.05. Found: C, 47.62; H, 7.82. Calcd. for the diadduct, $C_{10}H_{22}Si_2Cl_4$: C, 35.30; H, 6.52. Found: C, 36.16; H, 6.44.

Nmr spectra of both adducts indicate that the reactions occurred in an anti-Markovnikov manner without a positional isomerization of the double bonds.

Example 3 — Addition of Triethoxysilane to 1,7-Octadiene in the Presence of Chloroplatinate

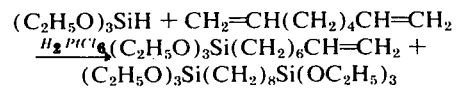

$(C_2H_5O)_3SiH + CH_2=CH(CH_2)_4CH=CH_2$
$\xrightarrow{H_2PtCl_6} (C_2H_5O)_3Si(CH_2)_6CH=CH_2 +$
$(C_2H_5O)_3Si(CH_2)_8Si(OC_2H_5)_3$ A. To a stirred mixture of 165 g (1.5 mole) 1,7-octadiene and 0.25 ml 10% ethanolic solution of 40% chloroplatinic acid, was added 82 g (0.5 mole) triethoxysilane slowly in 2 hours under nitrogen. The reaction mixture was then heated at 50°C. for 24 hours to complete the reaction. Fractional distillation of the crude product in vacuo yielded 108 g (79%) of the monoadduct, 7-octenyl triethoxysilane and 11 g (10%) of the diadduct, 1,8-bis-triethoxysilyl octane, both as colorless liquids. The monoadduct was distilled at 65°–68°C. at 0.05 mm, the diadduct at 140–1°C. at 0.1 mm.

Analyses Calcd. for the monoadduct, $C_{14}H_{30}SiO_3$: C, 61.26; H, 11.02. Found: C, 61.58; H, 10.57.

Nmr spectra of both adducts indicate anti-Markovnikov addition without a concurrent positional isomerization of the double bonds.

B. In another experiment, 4.1 g (0.025 mole) triethoxysilane was added slowly to a mixture of 2.75 g (0.025 mole) 1,7-octadiene and 0.04 ml of the ethanolic chloroplatinic acid solution. Anti-Markovnikov addition occurred on mixing the reactants as indicated by exothermicity and the decrease of the intensity of vinylic proton magnetic resonance signals of the reaction mixture.

Example 4 — Reaction of 7-Octenyl Trichlorosilane With Methanol

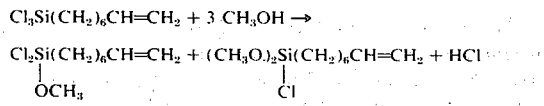

$$Cl_2Si(CH_2)_6CH=CH_2 + (CH_3O)_2Si(CH_2)_6CH=CH_2 + HCl$$
$$\phantom{Cl_2Si(}\overset{|}{OCH_3}\phantom{CH=CH_2 + (CH_3O)_2Si(CH_2)}\overset{|}{Cl}$$

To 246 g (1 mole) stirred 7-octenyl trichlorosilane was added 48 g (1.5 mole) methanol under $N_2$. The addition resulted in HCl evolution and some liquid phase separation. Subsequent heating at 65°C. for 17 hours resulted in a dark homogeneous liquid. This was fractionally distilled in vacuo to yield 119 g colorless liquid 7-octenyldimethoxy chlorosilane at 60°–62°C. under 0.1 mm pressure.

Analyses Calcd. for $C_{10}H_{21}ClO_2Si$: C, 50.72; H, 10.41. Found: C, 50.50; H, 9.52.

The nmr spectrum shows the presence of two methoxy groups per terminal vinylic group, as expected for the assumed structure.

Example 5 — Reaction of 7-Octenyl Trichlorosilane with Sodium Methoxide

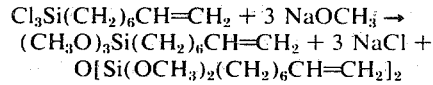
$$(CH_3O)_3Si(CH_2)_6CH=CH_2 + 3\ NaCl +$$
$$O[Si(OCH_3)_2(CH_2)_6CH=CH_2]_2$$

To a stirred 25% methanolic solution of 33.2 g (0.63 mole) sodium methoxide, is added 50.2 g (0.21 mole) 7-octenyl trichlorosilane with cooling below 50°C. The crude product was filtered with suction to remove the sodium chloride and then fractionally distilled in vacuo. At 48°–49°C. under 0.1 mm pressure, 32 g (75%) of colorless liquid 7-octenyl trimethoxysilane was obtained as the main product. At 127°–128°C. under 0.1 mm, 6.5 g (15%) of slightly colored liquid bis-7-octenyl dimethoxy disiloxane was received as a by-product.

Analyses Calcd. for $C_{11}H_{24}SiO_3$: C, 56.85; H, 10.41. Found: C, 55.72; H, 9.53. Calcd. for $C_{20}H_{44}Si_2O_5$: C, 57.09; H, 10.54. Found: C, 56.04; H, 9.87.

Both distillate products exhibited nmr spectra in accordance with their assumed structures.

Example 6 — Addition of Trichlorosilane to 1,5-Hexadiene in the Presence of Chloroplatinate

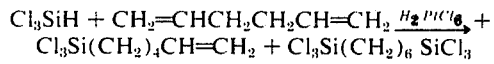
$$Cl_3Si(CH_2)_4CH=CH_2 + Cl_3Si(CH_2)_6SiCl_3$$

To a stirred mixture of 135.5 g (1 mole) trichlorosilane and 240.6 g (3 mole) 1,5-hexadiene, 0.4 ml of the 10% ethanolic chloroplatinic acid was added. The reaction mixture was then heated at 50°C for 65 hours. Subsequent fractionation of the crude product yielded 197 g (90%) of the monoadduct, 5-hexenyl trichlorosilane as a clear, colorless liquid distillate, bp. 33°–34°C at 0.7 mm. Also obtained was 8 g (4.5%) of a higher boiling diadduct fraction, 1,5-bis-trichlorosilyl hexane, as a colorless liquid with bp. 96°–98°C. at 0.25 mm.

Analyses Calcd. for monoadduct, $C_6H_{11}SiCl_3$: C, 33.12; H, 5.10. Found: C, 33.10; H, 4.74. Calcd. for diadduct, $C_6H_{12}Si_2Cl_6$: C, 20.41; H, 3.42. Found: C, 21.2; H, 3.40.

The nmr spectra of both adducts indicated that an anti-Markovnikov addition took place without any positional isomerization of double bonds.

Example 7 — Addition of Triethoxysilane to 1,5-Hexadiene in the Presence of Chloroplatinate

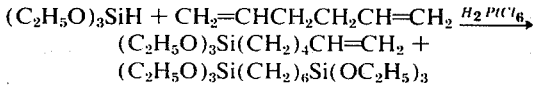
$$(C_2H_5O)_3Si(CH_2)_4CH=CH_2 +$$
$$(C_2H_5O)_3Si(CH_2)_6Si(OC_2H_5)_3$$

To a stirred mixture of 41 g (0.5 mole) 1,5-hexadiene and 0.25 ml 10 ethanolic chloroplatinic acid, 82 g (0.5 mole) triethoxysilane was added slowly during a period of 20 minutes. The mixture was then heated at 50°C for 24 hours to complete the reaction. The crude adducts were then fractionated by distillation in vacuo. The monoadduct, 5-hexenyl triethoxysilane was obtained as 55 g (44%) of a colorless liquid boiling between 55°–56°C at 0.15 mm. The diadduct, 1,5-bis-triethoxysilyl hexane was also obtained as a clear colorless liquid in a 40 g (39%) yield of distillate with a bp. of 127°–128°C at 0.15 mm.

Analyses Calcd. for monoadduct, $C_{12}H_{26}SiO_3$: C, 58.47; H, 26.21. Found: C, 58.56; H, 10.50. Calcd. for diadduct, $C_{18}H_{42}Si_2O_6$: C, 52.64; H, 10.31. Found: C, 53.29; H, 10.21.

The nmr spectra of the adducts supported the assumed structures.

Example 8 — Addition of Trichlorosilane to 1,4-Hexadiene in the Presence of Chloroplatinate

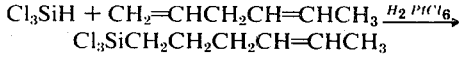
$$Cl_3SiCH_2CH_2CH_2CH=CHCH_3$$

To a stirred mixture of 41 g (0.5 mole) 1,4-hexadiene and 0.25 ml 10% ethanolic chloroplatinic acid, 67.8 g (0.5 mole) trichlorosilane was added in 10 minutes. The mixture was then kept at 55°C for 18 hours to complete the reaction. Nevertheless, nmr indicated only 66% conversion. The crude adduct was distilled to obtain 62 g (57%) of colorless liquid monoadduct, 4-hexenyl trichlorosilane, bp. 38°–39°C at 0.1 mm. There was only 2 g distillation residue, indicating that no significant quantities of diadducts were formed.

Analyses Calcd. for the monoadduct, $C_6H_{11}SiCl_3$: Cl, 48.88. Found: Cl, 47.87.

The nmr spectrum showed the presence of the $CH_3CH=CH-$ and the absence of $CH_2=CHCH_2-$ group. This indicated that a selective terminal addition took place without affecting the position of the internal double bond.

Nmr analysis of the reaction mixture before heating shows that a similarly selective but slower addition took place at ambient temperatures.

Example 9 — Addition of Triethoxysilane to 1,4-Hexadiene in the Presence of Chloroplatinate

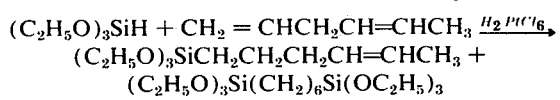

$(C_2H_5O)_3SiCH_2CH_2CH_2CH=CHCH_3$ +
$(C_2H_5O)_3Si(CH_2)_6Si(OC_2H_5)_3$

To a stirred mixture of 41 g (0.5 mole) 1,4-hexadiene and 0.25 ml of 10% ethanolic chloroplatinic acid, was added slowly 82 g (0.5 mole) triethoxysilane during 20 minutes. The mixture was then heated at 50°C where a short exotherm to 70° occurred. Thereafter, the heating was maintained at 50°C for 24 hours. The resulting crude product was then distilled to obtain 108 g (88%) of clear colorless liquid monoadduct, 4-hexenyl triethoxysilane, bp. 48°–50° at 0.15 mm and 8.5 g (8%) of dark residual liquid diadduct, 1,5-bis-triethoxysilyl hexane.

Analyses Calcd. for the monoadduct, $C_{12}H_{26}SiO_3$: C, 58.47; H, 10.64. Found: C, 59.14; H, 10.12.

The nmr spectrum of the monoadduct shows the presence of $CH_3CH=CH$ group. The spectrum of the residual diadduct is essentially identical with that of the diadduct of Example 7. The formation of such a diadduct in the present example apparently occurred via isomerization of the 4-hexenyl silane to the 5-hexenyl silane intermediate.

Example 10 — Addition of Trichlorosilane to 1,13-Tetradecadiene in the Presence of Chloroplatinate $Cl_3SiH + CH_2=CH(CH_2)_{10}CH=CH_2 \rightarrow$
$Cl_3Si(CH_2)_{12}CH=CH_2 +$
$Cl_3Si(CH_2)_mCH=CH(CH_2)_nCH_3 + Cl_3Si(CH_2)_{14}SiCl_3$ $m + n = 11$ A. To a stirred mixture of 62.7 g (0.32 mole) of 1,13-tetradecadiene andn 0.08 ml 10% isopropanol solution of 40% chloroplatinic acid, 21.7 g (0.16 mole) trichlorosilane was added slowly in 45 minutes. The mixture was kept between 25°–30°C for 2 hours with slight cooling. Then it was fractionally distilled to obtain 22 g (41%) clear, colorless liquid monoadduct, 13-tetradecenyl trichlorosilane, bp. 103°–105°C at 0.05 mm. The nmr spectrum of the product supported the assumed structure and thereby indicated that the distillate did not undergo any positional isomerization of the terminal double bond.

B. To a stirred mixture of 294 g (1.5 mole) 1,13-tetradecadiene and 0.75 ml 10% ethanolic chloroplatinic acid at 50°C is added 210 g (1.55 m) trichlorosilane over a period of 40 minutes. The temperature of the mixture exothermically rose to 70°C during the addition and was thereafter kept at 50°C for 24 hours. The resulting crude product was fractionally distilled in vacuo to separate the mono- and diadduct products.

The monoadduct was obtained as 348 g (70%) clear, colorless liquid having a bp. 123°–125°C at 0.3 mm. The nmr spectrum of this product showed the presence of one internal rather than terminal olefinic group. This indicated that addition and isomerization both occurred concurrently.

The diadduct was also a colorless liquid. It was obtained in a ayield of 66 g. i.e. 30%, with a bp. of 172°–175° at 0.3 mm. The nmr spectrum showed no branching and was in agreement with the bis-1,14-trichlorosilyl tetradecane structure.

Elemental analyses. Calcd. for the monoadduct, $C_{14}H_{27}SiCl_3$: C, 50.98; H, 27.22; Cl, 32.25. Found: C, 51.54; H, 8.31; Cl, 33.04. Calcd. for the diadduct, $C_{14}H_{28}Si_2Cl_6$: C, 36.14; H, 6.07; Cl, 45.72. Found: C, 36.75; H, 5.84; Cl 44.63.

Example 11 — Addition of Trichlorosilane to 1,13-Tetradecadiene with Ultraviolet Irradiation A stirred mixture of 6.8 g (0.05 mole) trichlorosilane and 19.6 g (0.1 mole) 1,13-tetradecadiene was irradiated in a closed quartz tube at 45°C for 72 hours with two Hanau 70 watt high pressure mercury immersion lamps, emitting a broad spectrum of ultraviolet light. The resulting crude product was then fractionated to yield 5 g (25%) of 13-tetradecenyl trichlorosilane as the monoadduct.

Example 12 — Addition of Trichlorosilane to 1,9-Decadiene in the Presence of Chloroplatinate

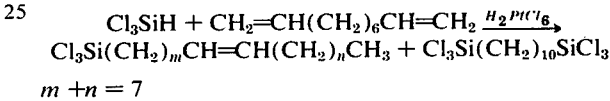

$Cl_3Si(CH_2)_mCH=CH(CH_2)_nCH_3 + Cl_3Si(CH_2)_{10}SiCl_3$ $m + n = 7$

To a stirred mixture of 276.5 g (2 mole) 1,9-decadiene and 1 ml 10% ethanolic chloroplatinic acid at 50°C, was added 220 g (1.6 mole) trichlorosilane during the course of 90 minutes. When the addition was half complete, an exothermic reaction was noted which raised the temperature of the mixture to 130°C. After all the trichlorosilane was added, the mixture was kept at 50°C for 5 more hours. The crude product was then fractionally distilled in vacuo.

A monoadduct was obtained in 180 g, 41%, yield as a clear, colorless liquid, bp. 73°–75°C at 0.2 mm. Its nmr spectrum showed that terminal monoaddition to the diene took place with a concurrent positional isomerization of one terminal double bond.

A clear, colorless liquid diadduct was also obtained in a yield of 21 g, i.e. 10%, with a bp. of 121°–123°C at 0.1 mm. Its nmr was in agreement with the straight chain alkylene moiety of the assumed bis-1,10-trichlorosilyl decane structure.

Elemental analyses. Calcd. for the monoadduct, $C_{10}H_{19}SiCl_3$: C, 43.88; H, 7.00; Cl, 38.86. Found: C, 44.53; H, 6.50; Cl, 39.16. Calcd. for the diadduct, $C_{10}H_{20}Si_2Cl_6$: C, 29.35; H, 4.93. Found: C, 30.35; H, 4.69.

SYNTHESIS OF SILYLALKYL PHOSPHINES

Example 13 — Addition of Diphenyl Phosphine to Vinyl Trichlorosilane

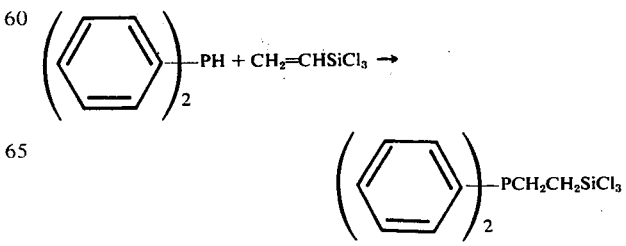

Into a quartz reaction vessel, equipped with a magnetic stirrer, nitrogen bubbler and a dropping funnel, was placed 13 g (0.07 mole) of the diphenyl phosphine reactant. To the stirred irradiated diphenyl phosphine under nitrogen was added 11.3 g (0.07 mole) of vinyl trichlorosilane in 5 minutes. The irradiation of the stirred reaction mixture at 15°C, by 2 75 watt Hanau immersion lamps having a high pressure mercury arc emitting a wide spectrum of irradiation, was continued for 24 hours. A subsequent analysis by nuclear magnetic resonance (nmr) spectroscopy of a sample indicated that an essentially quantitative addition reaction took place. No vinylic unsaturation was present in the final reaction mixture. The crude product was distilled in high vacuo to yield 19 g (80%) of distilled colorless liquid adduct boiling at 142°–144°C at 0.1 mm.

Elemental analyses. Calc. for $C_{14}H_{14}PSiCl_3$: C, 48.37; H, 3.98. Found: C, 48.19; H, 3.98.

Example 14 — Addition of Phenyl Phosphine to Vinyl Trichlorosilane

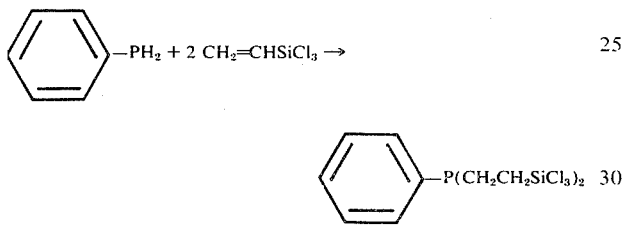

In the manner described in the previous example, 22 g (0.2 mole) of phenyl phosphine was added to 64.6 g (0.4 mole) of vinyl trichlorosilane. Nmr spectroscopy of the crude adduct indicated the absence of olefinic unsaturation. Fractional distillation in vacuo yielded 73 g (85%) of the clear, colorless liquid adduct boiling between 131°–132°C at 0.05 mm pressure.

Example 15 — Addition of Dicyclohexyl Phosphine to Vinyl Trichlorosilane $(C_6H_{11})_2PH +$
$CH_2=CHSiCl_3 \rightarrow (C_6H_{11})_2PCH_2CH_2SiCl_3$ A mixture of 19.8 g (0.1 mole) dicyclohexyl phosphine and 16.2 g (0.1 mole) vinyl trichlorosilane was irradiated in a closed quartz tube placed into a thermostated bath at 15°C. for 72 hours. For irradiation two 70 Watt Hanau high pressure mercury immersion lamps emitting a broad spectrum of irradiation were used. They were placed at a distance of approximately 5 cm from the quartz reaction vessel.

The resulting crude product was largely solid. It was taken up in benzene and fractionally distilled in vacuo under nitrogen. Between 96°–98°C. at 0.15 mm, 12 g (33%) of the 2-trichlorosilyl ethyl dicyclohexyl phosphine adduct was obtained as a viscous colorless liquid.

Analyses. Calcd. for $C_{14}H_{26}PSiCl_3$: C, 46.74; H, 7.28; Cl, 29.57. Found: C, 45.84; H, 6.88; Cl, 30.42.

Example 16 — Addition of Di-n-propyl Phosphine to Vinyl Trichlorosilane $(C_3H_7)_2PH + CH_2=CHSiCl_3 \rightarrow (C_3H_7)_2PCH_2CH_2SiCl_3$ A mixture of 12.4 g (0.105 mole) dipropyl phosphine and 16.1 g (0.1 m) vinyl trichlorosilane was irradiated at 15°C. for 24 hours as described in the previous example. The supernatant liquid crude product formed was then decanted from the viscous bottom phase. A fractional distillation of 18 g of the liquid product yielded 14 g (50%) colorless liquid 2-trichlorosilyl ethyl dipropyl phosphine adduct.

Analyses. Calcd. for $C_8H_{18}PSiCl_3$: C, 34.36; H, 6.49; P, 11.08. Found: C, 33.48; H, 6.42; P, 11.44.

Example 17 — Addition of Diphenyl Phosphine to Vinyl Triethoxysilane $(C_6H_5)_2PH +$
$CH_2=CHSi(OC_2H_5)_3 \rightarrow (C_6H_5)PCH_2CH_2Si(OC_2H_5)_3$ A mixture 20.35 g (0.11 mole) diphenyl phosphine and 24.1 g (0.1 mole) vinyl triethoxy silane was irradiated at 15°C for 18 hours. The resulting crude liquid product was fractionally distilled in vacuo. Between 155°–156°C at 0.06 mm, 37.6 g (82%) 2-triethoxysilylethyl diphenyl phosphine adduct distillate was obtained as a colorless liquid.

Analyses. Calcd. for $C_{20}H_{29}O_3PSi$: C, 63.80; H, 7.76; P, 8.23. Found: C, 63.93; H, 7.94; P, 8.22.

Example 18 — Addition of Diphenyl Phosphine to Allyl Trichlorosilane $(C_6H_5)_2PH +$
$CH_2=CHCH_2SiCl_3 \rightarrow (C_6H_5)_2P(CH_2)_3SiCl3 +$
$(C_6H_5)_2P(CH_2)_3P(C_6H_5)_2$ A mixture of 37.2 g (0.2 mole) diphenyl phosphine and 35.1 g (0.2 mole) allyl trichlorosilane was irradiated for 96 hours at 15°C. The crude product mixture was then filtered and fractionally distilled to isolate the desired adduct. Between 144°–145°C. at 0.1 mm, 28 g (38%) of 3-trichlorosilylpropyl diphenyl phosphine was obtained as a colorless liquid. Its assumed structure was supported by nmr spectroscopy. Nmr studies also indicated that the distillation residue (6 g) mainly consisted of bis-1,3-diphenyl propane, a product of allylic reversal.

Analyses. Calcd. for $C_{15}H_{16}PSiCl_3$: C, 49.81; H, 4.46; P, 8.56; A, 29.41. Found: C, 49.85; H, 4.65; P, 8.42; Cl, 28.55.

Example 19 — Addition of Diphenyl Phosphine to 7-Octenyl Methyldichlorosilane $(C_6H_5)_2PH +$
$CH_2=CH(CH_2)_6Si(CH_3)Cl_2 \leftrightarrow (C_6H_5)_2P(CH_2)_8Si(CH_3)Cl_2$ A mixture of 37.2 g (0.2 mole) diphenyl phosphine and 45 g (0.2 mole) of 7-octenyl methyldichlorosilane of Example 2 was irradiated at 15°C. for 96 hours. The resulting dark liquid product was fractionally distilled to yield 29 g (34%) of the 8-methyldichlorosilyl-octyl diphenyl phosphine adduct as a viscous, colorless liquid product, b.p. 188°–190°C. at 0.1 mm.

Analyses. Calcd. for $C_{21}H_{29}PSiCl_2$: C, 61.31; H, 7.10; P, 7.53; Cl, 17.24. Found: C, 60.45; H, 6.60; P, 7.84; Cl, 16.30.

Example 20 — Addition of Diphenyl Phosphine to 7-Octenyl Dimethoxychlorosilane $(C_6H_5)_2PH +$
$CH_2=CH(CH_2)_6Si(OCH_3)_2Cl \rightarrow (C_6H_5)_2P(CH_2)_8Si(OCH_3)_2Cl$ A mixture of 40.7 g (0.2 mole) diphenyl phosphine and 23.24 g (0.1 mole) 7-octenyl dimethoxychlorosilane of Example 4 was irradiated at 15° for 72 hours. An nmr spectrum of the resulting liquid product showed the disappearance of most of the vinylic protons, indicating addition to form 8-dimethoxychlorosilyloctyl diphenyl phosphine. However, the product decomposed on attempted distillation in vacuo when heated to 210°C.

Example 21 — Addition of Diphenyl Phosphine to 7-Octenyl Triethoxysilane

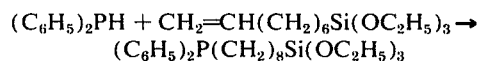

A stirred mixture of 20.8 g (0.111 mole) diphenyl phosphine and 15.2 g (0.055 mole) 7-octenyl triethoxysilane of Example 3 was irradiated at 15°C for 72 hours. The resulting crude yellow liquid was fractionated to yield 11 g (46%) 8-triethoxysilyloctyl diphenyl phosphine adduct. The adduct was a viscous colorless liquid of bp. 198°–200°C at 0.3 mm.

Analyses. Calcd. for $C_{26}H_{41}PO_3Si$: C, 67.79; H, 8.97. Found: C, 68.28; H, 8.61

Example 22 — Addition of Dicyclohexyl Phosphine to 7-Octenyl Triethoxysilane

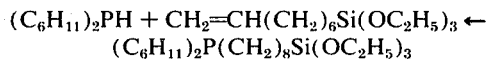

A stirred mixture of 29.7 g (0.15 mole) dicyclohexyl phosphine and 41.2 g (0.15 mole) 7-octenyl triethoxysilane of Example 3 was irradiated at 15°C for 72 hours. The colorless liquid product was fractionated to yield 18 g (26%) of 8-triethoxysilyl octyl dicyclohexyl silane monoadduct, bp. 195°–197°C at 0.1 mm.

Analyses. Calcd. for $C_{26}H_{55}PSiO_3$ : C, 66.06; H, 11.30. Found: C, 66.04; H, 10.50.

Example 23 — Addition of Diphenyl Phosphine to 7-Octenyl Trichlorosilane

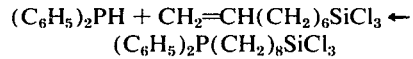

A mixture of 55.8 g. (0.3 mole) diphenyl phosphine and 73.7 g (0.3 mole) 7-octenyl trichlorosilane of Example 1 was irradiated for 37 hours at 15°C. The resulting viscous, colorless liquid product was fractionated to yield 90 g (70%) of the 8-trichlorosilyl-octyl diphenyl phosphine adduct, bp. 218°–221°C at 0.5 mm. The nmr spectrum of the crude adduct indicates a disappearance of about 70% of the vinylic protons of the unsaturated silane starting material in agreement with the observed product yield.

Analyses. Calcd. for $C_{20}H_{26}PCl_3Si$: C, 55.63; H, 6.06; P, 7.17; Cl, 24.64. Found: C, 55.64; H, 5.92; P, 7.78; Cl, 23.29.

Example 24 — Addition of Diphenyl Phosphine to 13-Tetradecenyl Trichlorosilane

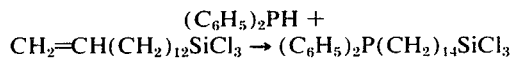

A mixture of 11.1 g (0.06 mole) of diphenyl and 10 g (0.03 mole) 13-tetradecenyl trichlorosilane phosphine of Example 10A was irradiated at 15°C for 113 hours. Distillation of the resulting crude product yielded 5 g (32%) of colorless viscous liquid 14-trichlorosilyltetradecyl diphenyl phosphine adduct, bp. 188°–190°C at 0.05 mm.

Analyses. Calcd. for $C_{26}H_{38}PSiCl_3$: C, 60.52; H, 7.42; P, 6.00. Found: C, 60.56; H, 7.21; P, 6.50.

B. When a mixture of 20.35 g (0.11 mole) diphenyl phosphine and 33 g (0.1 mole) tetradecenyl trichlorosilane of Example 10B, containing internal olefinic unsaturation, was irradiated for 96 hours at 15°C, nmr showed no significant disappearance of olefinic hydrogens. This indicated that in this case, no significant addition of the phosphine across the double bond of the silane took place. The internally unsaturated tetradecenyl trichlorosilane was similarly unreactive towards diethyl and dipropyl phosphines.

Example 25 — Addition of Diphenyl Phosphine to Vinylphenylethyl Trichlorosilane

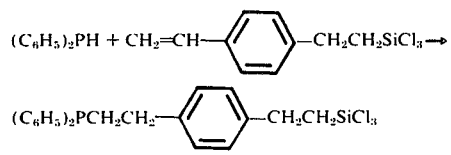

A mixture of 48.5 g (0.26 mole) diphenyl phosphine and 69.1 g 50% (0.13 mole) vinylphenylethyl trichlorosilane, prepared by the addition of trichlorosilane to technical divinyl benzene, was irradiated for 72 hours at 15°C. The resulting crude mixture had a small amount (4g) of viscous precipitate, which was removed by decantation of the supernatant liquid. Fractional distillation yielded 48 g (82%) of 2-trichlorosilylethylphenylethyl diphenyl phosphine adduct as a viscous, slightly yellow liquid of bp. 220°–225°C at 0.3 mm.

Analyses. Calcd. for $C_{22}H_{22}PCl_3Si$: C, 58.48; H, 4.91; P, 6.86; Cl, 23.54. Found: C, 60.09; H, 5.12; P, 7.07; Cl 22.53.

ANCHORING TO GLASS AND COMPLEXING WITH TRANSITION METALS OF SILYLALKYL PHOSPHINES

Example 26 — Dehydration of Silica Used for Anchoring

Grade HSF cab-o-sil, having a surface area about 300 $M^2/g$, obtained from the Cabot Co., Boston, Mass., was heat-treated using a fluidized sand bath equipped with high vacuum stopcock and O-ring construction for 16 hours at >325°C at $10^{-4}$ mm Hg vacuum pressure. According to the literature (see Advances in Catalysis and Related Subjects, Vol. 16, Ed. D.D. Eley, H. Pines, and P. B. Weise, H. P. Boehm, particularly pages 242–244, Acad. Press, N.Y., 1966), the above heat-treatment of silica is sufficient to remove physically absorbed water. According to the above-referred literature the heat treated cab-o-sil so obtained has about 3 silanol groups per $10^{-6}$ $cm^2$ silica surface. One g cab-o-sil has $3 \times 10^6$ $cm^2$ surface which means $1.5 \times 10^{-3}$ mole equivalents of silanol. The above treated cab-o-sil was then transferred to a dry box and stored in a tightly-capped bottle until use.

Example 27 — Reaction of the Phosphine $(C_6H_{11})_2P(CH_2)_2SiCl_3$ with Dehydrated Cab-o-sil A 1.87 g portion of $(C_6H_{11})_2P(CH_2)_2SiCl_3$ (5.0 mm) was dissolved in 40 ml benzene and added to 12.5 g dehydrated cab-o-sil of Example 26 in 5 ml portions with thorough grinding. The benzene was removed from the cab-o-sil by vacuum drying at $5 \times 10^{-2}$ mm Hg vacuum pressure for three hours at room temperature. The impregnated cab-o-sil was then heated at 100°C at 5 × $10^{-2}$ mm Hg pressure for 16 hours. A sample of the phosphine on cab-o-sil was submitted for C, H, P, Cl analysis. Found: C, 6.85; H, 1.16; P, 1.10; Cl, 1.51. Calculated (assuming the phosphine $(C_6H_{11})_2P(CH_2)_2SiCl_3$ was unreacted on the cab-o-sil surface): C, 6.07; H, 0.95; P, 1.12; Cl, 3.84. All operations involving air sensitive materials were performed in a nitrogen purged dry box. This example demonstrates that the above heat-treatment of the phosphine, of example 15, on dehydrated cab-o-sil will eliminate 1.81 moles hydrogen chloride per mole phosphine from the cab-o-sil surface.

Example 28 — Reaction of The Anchored Phosphine of Example 27 With Rhodium Carbonyl Chloride A 5.76 g portion of the impregnated phosphine, Example 27 containing 2.0 mm of phosphine, was impregnated with the light yellow solution of 0.194 g. $[(CO)_2RhCl]_2$ (0.50 mm) dissolved in 15 ml benzene. The impregnated complex was ground for 20 minutes to insure a homogeneous distribution of rhodium carbonyl chloride on the cab-o-sil surface. Following thorough mixing, the impregnated cab-o-sil was dried at ambient temperature for 1 hour at 5 × $10^{-2}$ mm Hg vacuum pressure. Sixty ml of benzene was then added and the mixture was stirred for 10 minutes. The mixture was then suction filtered through a fine glass filter frit. Complete retention of the rhodium complex $[(C_6H_{11})_2P(CH_2)_2SiCl_3]_2Rh(CO)Cl$, on the cab-o-sil surface, was evidenced by the water white color of the benzene filtrate. The impregnated rhodium complex when then dried for 16 hours at $10^{-2}$ mm Hg vacuum pressure at 50°C. A sample of the anchored rhodium complex was submitted for C, H, Rh, P, Cl. Found: C, 6.84; H, 1.26; Rh, 1.86; P, 1.06; Cl, 1.42; Calculated (assuming the complex $[(C_6H_{11})_2P(CH_2)_2SiCl_3]_2Rh(CO)Cl$ was the product of the above reaction); C, 6.36; H, 0.96; Rh, 1.88; P, 1.13; Cl, 4.53.

This example demonstrates the ready formation of an anchored phosphine-rhodium complex by impregnation of rhodium dicarbonyl chloride dimer onto phosphine anchored to cab-o-sil below its point of incipient wetness.

Example 29 — Reaction of the Anchored Phosphine of Example 27 with 1,5-cyclooctadiene Rhodium Chloride Dimer in Benzene Solution A 4.38 g portion (1.66 mm phosphine) of the anchored phosphine cab-o-sil composition of Example 27 was reacted with 0.136 g [1,5-cyclooctadiene $RhCl]_2$ (0.28 mm) in 50 ml benzene by addition of the yellow benzene solution to the impregnated phosphine. The resulting mixture was of light yellow color without evidence of a solid phase indicating that a fine suspension had been formed. The mixture was magnetically stirred with a teflon stirrer for one-half hour, suction filtered through a fine sintered glass frit, and washed with three-10 ml portions of benzene. The residue was dryed for 16 hrs. at ambient temperature at 5 × $10^{-2}$ mm Hg vacuum pressure. Evidence for the displacement reaction of the impregnated phosphine ligands for the 1,5-cyclooctadiene ligand of the rhodium complex was the water white color of the benzene filtrate from the above filtration.

Analysis of the above residue confirmed the formation of a rhodium complex; Found: C, 7.36; H, 1.52; Rh, 1.16; P, 1.03; Cl, 2.02; Calculated (based on the assumption that the rhodium phosphine complex $[(C_6H_{11})_2P(CH_2)_2SiCl_3]_3$ RhCl was the product in the above reaction): C, 6.36; H, 0.98; Rh, 1.29; P, 1.16; Cl, 4.44.

This example demonstrates the ready formation of a phosphine rhodium complex by reaction in solvent suspension a diene rhodium chloride dimer with a phosphine affixed to a silica surface.

Example 30 — Anchoring of Phosphine at Room Temperature and Its Subsequent Reaction with Methanol A 1.39 g portion $\phi_2P(CH_2)_2SiCl_3$ (4.0 mm) was dissolved in 40 ml benzene and added with thorough grinding to 10 g dehydrated cab-o-sil, Example 26. The benzene was removed from the cab-o-sil by drying at 5 × $10^{-2}$ mm Hg vacuum pressure for 2 hours at ambient temperature. A portion of the vacuum dried sample was submitted for C, H, P, Cl analysis: Found: C, 7.19, H, 0.87; P, 1.15; Cl, 2.18; Calculated (based on the assumption that the phosphine $_2P(CH_2)_2SiCl_3$ was unreacted on the cab-o-sil surface): C, 5.90; H, 0.50; P, 1.09; Cl, 3.73. The vacuum dried portion remaining was refluxed for 2 hours with 120 ml methanol to remove the remaining chlorosilane groups from the impregnated phosphine. The mixture was then suction filtered through a fine sintered glass filter frit and the residue was washed with two-50 ml portions of methanol. The residue was dried for 16 hours at 80°C at 5 × $10^{-2}$ mm Hg vacuum pressure. A portion of the methanol washed sample was submitted for C, H, P, Cl analysis. Found: C, 7.12; H, 0.83; P, 1.14; Cl, 1.03; Calculated (assuming the phosphine $\phi_2P(CH_2)_2SiCl_3$ was unreacted on the cab-o-sil surface): C, 5.90; H, 0.50; P, 1.09; Cl, 3.73.

This example demonstrates the reaction of a trichlorosilylated phosphine with dehydrated cab-o-sil at ambient temperature. The results also show that on refluxing the anchored phosphine with methanol only a part of the remaining chlorosilane groups are reacted.

Example 31 — Reaction of Trichlorosilylated Phosphines with Undehydrated Cab-o-sil.

A 2.0 g portion of undehydrated K-5 cab-o-sil was slurryed in 40 ml benzene by magnetic stirring and brought to refluxing. A 4.17 g portion of $\phi_2P(CH_2)_2SiCl_3$ of Example 13 was dissolved in 10 ml benzene and added to the cab-o-sil/benzene mixture. The mixture was maintained at reflux for two hours. A 50 ml portion benzene was added and the mixture refluxed for an additional 2 hours. The mixture was suction filtered through a fine sintered glass filter frit and the residue was washed with three-10 ml portions benzene. The residue was dried at ambient temperature for two hours at 5 × $10^{-2}$ mm Hg vacuum pressure.

A portion of the dried residue was submitted for C, H, P, Cl analysis: Found: C, 13.35; H, 1.35; P, 2.21; Cl, 2.39; Calculated (assuming that 4.17 g $\phi_2P(CH_2)_2SiCl_3$ was unreacted on 2.0 g undehydrated cab-o-sil): C, 32.69; H, 2.74; P, 6.02; Cl, 20.67.

The remaining amount of the dried residue was Soxlet extracted with benzene for 16 hrs under a nitrogen puge. The Soxlet extracted material was dried at ambient temperature for two hours at 5 × $10^{-2}$ mm Hg vacuum pressure. A portion of the dried material was submitted for C, H, P, Cl analysis; Found: C, 12.27; H, 1.17; P, 2.22; Cl, 1.66.

This example demonstrates the anchoring of a trichlorosilylated phosphine to an undehydrated cab-o-sil surface. This example also demonstrates the complete retention of the phosphine affixed to the silica surface by the above procedure following benzene extraction. This example also demonstrates that maximum phosphine concentration on the silica surface can be achieved by reaction of undehydrated cab-o-sil with excess trichlorosilylated phosphine in benzene solution. The maximum phosphine concentration possible on K-5 cab-o-sil, was determined by reaction of excess trichlorosilylated phosphine with dehydrated cab-o-sil followed by refluxing with benzene, as shown by Example 32.

Example 32 — Reaction of Trichlorosilylated Phosphines with Dehydrated Cab-o-sil to Achieve Maximum Phosphine Coverage A 4.0 g portion of dehydrated K-5 cab-o-sil was impregnated with 2.28 g of the phosphine of Example 13 dissolved in 16 ml benzene. A 2.28 g (6.58 mm) portion of the phosphine is the quantity of phosphine required to react with every chemically reactive silanol group of the 4.0 g quantity of dehydrated cab-o-sil (there are 6.58 mm silanol groups per 4 g dehydrated cab-o-sil). The benzene was removed at ambient temperature at $5 \times 10^{-2}$ mm Hg vacuum pressure for 3 hours. The dried product was then heated for 18 hrs. at 155°C at $5 \times 10^{-2}$ mm Hg vacuum pressure. A portion of the above heat-treated material was submitted for C, H, P, Cl analysis. Found: C, 20.16; H, 1.77; P, 3.60; Cl, 7.49. Calculated (assuming the 2.28 g phosphine $\phi_2P(CH_2)_2SiCl_3$ was unreacted on the 4 g cab-o-sil): C, 17.58; H, 1.48; P, 3.24; Cl, 11.12.

Three 0.3 g portions of the heat-treated material were subjected to the following solvent treatments:

1. Refluxing in 10 ml benzene for one-half hr. The mixture was suction filtered through a fine sintered glass filter frit and washed with a 50 ml portion tetrahydrofuran. The residue was dried at ambient temperature for 2 hrs. at $5 \times 10^{-2}$ mm Hg vacuum pressure.

2. Refluxing in 10 ml water saturated benzene for 15 min. The mixture was suction filtered through a fine sintered glass filter frit and washed with a 50 ml portion tetrahydrofuran. The residue was dried at ambient temperature for 2 hrs. at $5 \times 10^{-2}$ mm Hg vacuum pressure.

3. Refluxing in 50 ml methanol for 10 min. The mixture was suction filtered through a fine sintered glass filter frit. The residue was then refluxed for 10 min with 10 cc benzene-10 cc pyridine solution. The mixture was again suction filtered through a fine sintered glass filter frit and washed with a 50 ml protion of tetrahydrofuran.

All three samples were submitted for C, H, P, Cl analysis, respectively; Found: (1) C, 12.92; H, 1.40; P, 2.16; Cl, 3.82; (2) C, 13.03; H, 1.30; P, 1.92; Cl, 1.69; (3) C, 13.55; H, 1.35; P, 1.92; Cl, 0.97; Calculated (see above).

This example demonstrates the near complete reaction of trichlorosilylated phosphines with dehydrated cab-o-sil with removal of HCl upon heat-treatment of 155°C based on the chlorine analysis of the heat-treated material, i.e., 0.98 mm Cl were removed as HCl per mm phosphine. This example also demonstrates the phosphine retained on the cab-o-sil surface following the three solvent treatments to be essentially the same, i.e., 2.16% P, 1.92% P, and 1.92%, respectively. That the phosphine not retained on the cab-o-sil surface following benzene solvent washing was removed from the cab-o-sil surface an unreacted trichlorosilylated phosphine is supported by the approximate 3:1 ratio of the chlorine to phosphine ratio of the material removed by benzene refluxing (for a decrease of 1.44% phosphorous, 3.67% Cl was removed upon benzene reflux). This example further demonstrates the relative reactivity of the chlorine retained by the anchored phosphine toward water saturated benzene, and methanol followed by pyridine washing. To serve as a comparison to the final phosphine concentration a loading of about 2.0% is identical to the surface requirement determined for trimethyl silane on silica surfaces, both area requirements being about 50 $A^2$ per trimethyl silane or trichlorosilylated phosphine group.

Example 33 — Reaction of the Anchored Phsophine of Example 30 with Rhodium Carbonyl Chloride A 5.70 g portion of the impregnated phosphine of Example 30 (2.0 mm of phosphine) was impregnated with 0.194 g of $[(CO)_2RhCl]_2$, (0.5 mm) dissolved in 20 ml benzene. The impregnated complex was ground for 20 minutes with a stainless steel spatula and the benzene was then removed by drying at ambient temperature for 1 hour at $5 \times 10^{-2}$ mm Hg vacuum pressure. A portion of the above rhodium complex was submitted for C, H, Rh, P, Cl analysis. Found: C, 7.14; H, 0.80; Rh, 1.95; P, 1.18; Cl, 0.75. Calculated (based on the assumption that the rhodium phosphine complex $[\phi_2P(CH_2)_2SiCl_3]_2Rh(CO)Cl$ was the product in the above reaction): C, 5.99; H, 0.48; Rh, 1.77; P, 1.07; Cl, 4.27. The vacuum dried rhodium complex on cab-o-sil was stirred for 10 minutes with 60 ml benzene. The mixture was suction filtered with a fine glass filter frit and the residue was dried at 50°C for three hours at $5 \times 10^{-2}$ mm Hg vacuum pressure. Retention of the rhodium complex on the cab-o-sil surface was indicated by the water white color of the above benzene filtrate. A portion of the rhodium complex stirred with benzene and vacuum dried was submitted for C, H, Rh, P, Cl analysis. Found: C, 7.25; H, 0.93; Rh, 1.65; P, 1.12; Cl, 1.48; Calculated (see previous assumption above for calculated values): C, 5.99; H, 0.48; Rh, 1.77; P, 1.07; Cl, 4.27.

This example demonstrates again the ready formation of a phosphine rhodium complex by impregnation with a rhodium dicarbonyl chloride dimer solution onto a cab-o-sil containing anchored phosphine.

Example 34 — Reaction of the Anchored Phosphine of Example 30 With 1,5 Cyclooctadiene Rhodium Chloride Dimer A 4.73 g portion of the impregnated phosphine of Example 30 (1.66 mm phosphine) was reacted with 0.136 g [1,5-cyclooctadiene $RhCl]_2$ (0.28 mm) in 50 ml benzene by slow addition of the benzene solution to the anchored phosphine and stirring the resultant fine suspension for one-half hour. The mixture was then suction filtered through a fine glass filter frit and the residue was washed with three-10 ml portions of benzene. The residue was dried at ambient temperature for 16 hours at $5 \times 10^{-2}$ mm Hg vacuum pressure. Retention of the rhodium complex on the cab-o-sil surface was indicated by the water white color of the above benzene filtrate. A portion of the above impregnated rhodium complex was submitted for C, H, Rh, P, Cl analysis. Found: C, 7.88; H, 1.01; Rh, 1.77; P, 1.08, Cl, 1.08; Calculated (based on the assumption that the rhodium phosphine complex $[\phi_2P(CH_2)_2SiCl_3]_3RhCl$ was the product of the above reaction): C, 5.77; H, 0.48; Rh, 1.18; P, 1.06; Cl, 4.06.

This example demonstrates again the ready formation of an anchored phosphine rhodium complex by reaction in a fine-suspension of a diolefin rhodium chloride dimer with the phosphine chemically affixed to a silica surface.

Example 35 — Anchoring a Phosphine at Room Temperature and its Subsequent Reaction with Methanol A 4.33 g portion of $\phi_2P(CH_2)_8SiCl_3$ (10.0 mm) was impregnated onto 25 g dehydrated cab-o-sil utilized two impregnations of 4 mm of $\phi_2P(CH_2)_8SiCl_3$ of Example 23 dissolved in 40 ml benzene onto two-10 g portions of dehydrated cab-o-sil, Example 26, and one impregnation of 2 mm of $\phi_2P(CH_2)_8SiCl_3$ dissolved in 20 ml benzene onto one 5 g portion of dehydrated cab-o-sil, Example 26. The three portions were combined in a 1000 cc side arm vacuum flask and dried for three hours at ambient temperature at $5 \times 10^{-2}$ mm Hg vacuum pressure. A 300 ml portion of methanol was added to the impregnated phosphine and the mixture was refluxed with stirring for 2 hours. The mixture was then vacuum filtered through a fine glass filter frit and the residue was washed with two 50 ml portions methanol. The residue was dried for 16 hours at 80°C at $5 \times 10^{-2}$ mm Hg vacuum pressure. A portion of the methanol washed sample was submitted for C, H, P, Cl analysis. Found: C, 9.12; H, 1.18; P, 1.04; Cl, 0.21; Calculated (assuming the phosphine $\phi P(CH_2)_8SiCl_3$ was unreacted on the cab-o-sil surface) C, 8.19; H, 0.89; P, 1.06; Cl, 3.63.

This example again demonstrates the reaction of a trichlorosilylated phosphine with dehydrated cab-o-sil at ambient temperature. This example also demonstrates that the chlorosilyl groups have increased reactivity towards methanol if they are separated from the phosphine group by a polymethylene chain.

Example 36 — Reaction of the Anchored Phosphine of Example 35 with Rhodium Carbonyl Chloride A 5.86 g portion of the anchored phosphine (2.0 mm) of Example 35 was impregnated with 0.194 $[(CO)_2RhCl]_2$ (0.50 mm) dissolved in 20 ml benzene. The impregnated complex was ground for 20 min. with a stainless steel spatula and the benzene was then removed by drying at ambient temperature for 1 hr. at $5 \times 10^{-2}$ mm Hg vacuum pressure. A portion of the above rhodium complex was submitted for C, H, Rh, P, Cl analysis. Found: C, 9.18; H, 1.16; Rh, 1.70; P, 1.02; Cl, 0.70. Calculated (based on the assumption that the rhodium phosphine complex $[\phi_2P(CH_2)_8SiCl_3]_2Rh(CO)Cl$ was the product in the above reaction): C, 8.17; H, 0.87; Rh, 1.71; P, 1.03; Cl, 4.11.

This example demonstrates again the ready formation of anchored phosphine-rhodium complex by impregnation of rhodium dicarbonyl chloride dimer onto cab-o-sil below its point of incipient wetness.

Example 37 — Reaction of the Anchored Phosphine of Example 35 With 1,5-cyclooctadiene Rhodium chloride Dimer A 4.86 g portion of the anchored phosphine (1.66 mm phosphine) of Example 35 was reacted with 0.136 $[1,5$-cyclooctadiene $RhCl]_2$ (0.28 mm) in 50 ml benzene by slow addition of the benzene solution to the impregnated phosphine and stirring the colloidal solution for one-half hour. The mixture was then suction filtered through a fine glass filter frit and the residue was washed with three-10 ml portions of benzene. The residue was dried at ambient temperature for 16 hrs. at $5 \times 10^{-2}$ mm Hg vacuum pressure. Retention of the rhodium complex on the cab-o-sil surface was indicated by the water white color of the above benzene filtrate. A portion of the above impregnated complex was submitted for C, H, Rh, P, Cl analysis. Found: C, 9.07; H, 1.18; Rh, 1.28; P, 1.09; Cl, 0.60. Calculated (based on the assumption that the rhodium phosphine complex $[\phi_2P(CH_2)_8SiCl_3]_3RhCl$ anchored to the silica was the product of the above reaction): C, 8.04; H, 0.88; Rh, 1.15; P, 1.07; Cl, 3.96.

This example demonstrates again the ready formation of an anchored phosphine rhodium complex by reaction of a solution of a rhodium diolefin complex with the solution suspended phosphine chemically affixed to a silica surface.

Example 38 — Reaction of Complex $[\phi_2P(CH_2)_8SiCl_3)(1,5$-Cyclooctadiene) Rhodium Chloride$]_2$ Prepared in situ with Dehydrated cab-o-sil, Ex. 26

A 0.25 g portion of $[(1,5$-cyclooctadiene$)RhCl]_2$ (0.50 mm) was dissolved in 10 ml benzene and added to 0.43 g $\phi_2P(CH_2)_8SiCl_3$ (1 mm) dissolved in 10 ml benzene. The solution was stirred for one-half hr. The solution was added to 2.5 g dehydrated cab-o-sil in four 5 ml portions with thorough grinding. Benzene was removed from the impregnated rhodium complex by vacuum drying for two hours at ambient temperature at $5 \times 10^{-2}$ mm Hg vacuum pressure. A portion of the rhodium complex $[\phi_2P(CH_2)_8SiCl_3(1,5$-cyclooctadiene$)RhCl]_2$ impregnated on cab-o-sil was submitted for C, H, Rh, P, Cl analysis. Found: C, 10.31; H, 1.34; Rh, 3.44; P, 1.15; Cl, 3.57; Calculated (based on the assumpiton that the rhodium phosphine complex $[(\phi_2P(CH_2)_8SiCl_3)$ $(1,5$-cyclooctadiene$)RhCl]_2$ anchored to silica was the product of the above reaction): C, 10.6, H, 1.20; Rh, 3.23; P, 0.97; Cl, 4.45.

This example demonstrates the ready formation of an anchored rhodium phosphine complex of P:Rh ratio of 1:1 by preparation of rhodium phosphine complex in situ and subsequent impregnation onto dehydrated cab-o-sil.

Example 39 — Reaction of Complex $[(\phi_2P(CH_2)_2SiCl_3)(1,5$-Cyclooctadiene) Rhodium Chloride$]_2$ Prepared in Situ with Dehydrated Cab-o-sil, A 2.5 g portion of $[(1,5$-cyclooctadiene$)RhCl]_2$ (0.50 mm) was dissolved in 10 ml benzene and added to 0.348 g $\phi_2P(CH_2)_2SiCl_3$ (1 mm) of Example 13 dissolved in 10 ml benzene. The solution was stirred for one-half hour. The solution was added to 2.5 g dehydrated cab-o-sil in four 5 ml portions with thorough grinding. Benzene was removed from the impregnated rhodium complex by vacuum drying for two hours at ambient temperature at 5 × 10$^{-2}$ mm Hg vacuum pressure. The dried catalyst was washed with 150 ml methanol, suction filtered through a fine filter frit, and vacuum drying at ambient temperature. A portion of the rhodium complex [$\phi_2$P(CH$_2$)$_2$SiCl$_3$ (1,5-cyclooctadiene)RhCl]$_2$ impregnated on cab-o-sil was submitted for C, H analysis. Found: C, 6.03; H, 0.74. Calculated (based on the assumption that the rhodium phosphine complex [($\phi_2$P(CH$_2$)$_2$SiCl$_3$)(1,5-cyclooctadiene)RhCl]$_2$ anchored to silica was the product of the above reaction): C, 8.54; H, 0.85.

This example demonstrates again the ready formation of an anchored phosphine complex of P:Rh ratio 1:1 by preparation of the rhodium phosphine complex in situ and subsequent impregnation onto dehydrated cab-o-sil.

Example 40 — Reaction of Complex [($\phi_2$P(CH$_2$)$_{14}$SiCl$_3$)(1,5-Cyclooctadiene) Rhodium Chloride]$_2$ Prepared in Situ with Dehydrated Cab-o-sil A 0.25 g portion of [(1,5-cyclooctadiene)RhCl]$_2$ (0.50 mm) was dissolved in 10 ml benzene and added to 0.516 g $\phi_2$P(CH$_2$)$_{14}$SiCl$_3$ (1 mm) of Example 24 dissolved in 10 ml benzene. The solution was stirred for one-half hr. The solution was added to 2.5 g dehydrated cab-o-sil in four 5 ml portions with thorough grinding. Benzene was removed from the impregnated rhodium complex by vacuum drying for two hours at ambient temperature at 5 × 10$^{-2}$ mm Hg vacuum pressure. The dried catalyst was washed with 150 ml methanol, suction filtered through a fine filter frit, and methanol was removed by vacuum drying at ambient temperature. A portion of the rhodium complex [$\phi_2$P(CH$_2$)$_{14}$SiCl$_3$)(1,5-cyclooctadiene)RhCl]$_2$ impregnated on cab-o-sil was submitted for C, H analysis. Found: C, 7.48; H, 1.35. Calculated (based on the assumption that the rhodium phosphine complex [($\phi_2$P(CH$_2$)$_{14}$SiCl$_3$)(1,5-cyclooctadiene)RhCl]$_2$ anchored to silica was the product of the above reaction: C, 12.51; H, 1.54.

This example demonstrates again the ready formation of an anchored rhodium phosphine complex of P:Rh ratio 1:1 by preparation of the rhodium phosphine complex in situ and subsequent impregnation onto dehydrated cab-o-sil.

Example 41 — Reaction of Complex [$\phi_2$P(CH$_2$)$_2$Si(OC$_2$H$_5$)$_3$ (1,5-Cyclooctadiene) Rhodium Chloride]$_2$ Prepared in Situ with Dehydrated Cab-o-sil A 0.25 g portion of [(1,5-cyclooctadiene)RhCl]$_2$ (0.50 mm) was dissolved in 10 ml benzene and added to 0.32 g (2.0mm) $\phi_2$P(CH$_2$)$_2$Si(OC$_2$H$_5$)$_3$ of Example 17 dissolved in 10 ml benzene. The solution was stirred for one-half hr. The solution was added to 2.5 g dehydrated cab-o-sil in four 5 ml portions with thorough grinding. Benzene was removed from the impregnated rhodium complex by vacuum drying for 2 hours at ambient temperature at 5 × 10$^{-2}$ mm Hg vacuum pressure. A portion of the rhodium complex was submitted for C, H analysis. Found: C, 5.24; H, 0.76; Calculated (based on the assumption that the rhodium phosphine complex [$\phi_2$P(CH$_2$)$_2$Si(OC$_2$H$_5$)$_3$ (1,5-cyclooctadiene) RhCl]$_2$ was the product of the above reaction): C, 9.96; H, 1.22.

This example demonstrates again the ready formation of an anchored rhodium phosphine complex of P:Rh ratio 1:1 via preparation of the rhodium phosphine complex in situ and subsequent anchoring to the dehydrated cab-o-sil surface.

Examples 42–51 — Catalysts of Propylene Hydroformylation

Propylene hydroformylation catalytic activity of the heterogeneous rhodium catalysts examples number 28, 29, 33, 35, 36, 37 and 38, 39, 40, 41 were investigated in an Autoclave Engineer's 300 cc capacity autoclave. The heterogeneous rhodium catalysts were placed in a glass liner to which 70 ml benzene had been added. All operations were performed in a nitrogen purged dry box. The glass liner was sealed with a rubber stopper and transferred to the autoclave where the glass liner was blanked by a purge of argon during assemblage of the autoclave stirrer. Propylene was introduced to the stirred benzene solution until the benzene solution was saturated. The propylene concentration was found to be reasonably constant by the above procedure. The temperature was increased to 100°C. and CO/H$_2$ (50:50 blend) was added to give a total pressure of 1000 psi. The temperature was increased slowly up to a maximum temperature of 180°C. The total CO/H$_2$ absorbed was noted as well as the time and temperature at each increment.

Example 42

The anchored rhodium phosphine complex prepared as described in example 38 was an active propylene hydroformylation catalyst. Because of the marked greater activity of this catalyst compared to those prepared as described in examples 28, 29 33, 34, 36 and 37, a number of recycling steps with the catalyst were performed and demonstrated an increase in catalytic activity with no apparent decrease beyond a consistently high activity. A 0.5 mm, as rhodium, portion of example 38 gave a total of 420 pounds CO/H$_2$ uptake over a 210 minute interval with a final temperature of 175°C. The catalyst from the above hydroformylation run was suction filtered through a fine sintered glass frit. The residue was washed with 100 ml benzene. Before the rhodium complex on cab-o-sil was allowed to dry, the catalyst was recharged for another hydroformylation run. The catalyst was carried out over a time interval of 86 minutes at 135°C. with a total CO/H$_2$ consumption of 1320 pounds. The catalyst was filtered, washed with 100 ml benzene and recharged as previously described above The catalysis was carried out over a time interval of 175 min. at 135°C. with a total CO/H$_2$ consumption of 1160 pounds. Normalbutyraldehyde to isobutyraldehyde ratio was 1.05 and 1.25 for the latter two runs, respectively. Similar effectiveness is observed for an analogous homogeneous triphenylphosphine complex catalyst. This example demonstrates that the anchored rhodiumphosphine catalysts are effective for hydroformylation and retain their activity through several cycles.

Example 43

The anchored rhodium complex prepared as described in example 28 was inactive for propylene hydroformylation. A 0.5 mm, as rhodium, portion of example 28 was heated to 180°C. over a 77 minute interval without CO/H$_2$ consumption.

In order to establish that there was no poisoning effect of the heterogeneous rhodium complex for hydroformylation catalytic activity the test reaction of this example was cooled to room temperrature and 1.0 ml of $(\phi_3P)_3RhCl$ in 50 ml toluene was added to the reaction solution. Rapid reaction typical of an active homogeneous rhodium catalyst was evidenced by $CO/H_2$ consumption of 780 pounds at over a 25 min. interval at 150°C.

Since the analogous homogeneous triphenylphosphine complex catalyst is effective, this example demonstrates that the anchored catalyst systems have their own surface and sterochemical requirements. This example further demonstrates that anchored rhodium-phosphine catalysts above with a rhodium-phosphine ratio of 1:3 are not effective for hydroformylation (see example 47 for comparison).

Example 44

The anchored rhodium complex prepared as described in Example 29 was inactive for propylene hydroformylation. A 0.3 mm, as rhodium, portion of Example 29 was heated to 165°C. over a 143-minute interval without $H_2/CO$ consumption. The infrared spectrum of the catalyst used in the above experiment exhibited an intense carbonyl stretching band at 1960 $cm^{-1}$, identical in in tensity and frequency to the anchored phosphine rhodium carbonyl complex of Example 28.

This example demonstrates that the anchored catalyst was modified by the CO reagent. However, the modified catalyst was inactive compared to those having a longer anchoring alkylene group (see Example 47 for comparison).

Example 45

This anchored rhodium complex prepared as described in Example 33 was inactive for propylene hydroformylation. A 0.5 mm, as rhodium, portion was heated to 160°C. over a 72-minute interval without $CO/H_2$ consumption. This lack of activity demonstrates again the need for a longer alkylene group in anchoring.

Example 46

The anchored rhodium complex having an ethylene group between Si and P as described in Example 34 was inactive for propylene hydroformylation. A 0.41 mm, as rhodium, portion of Example 34 was heated to 155°C. over a 83 minute interval without $CO/H_2$ consumption. This lack of activity demonstrates again the need for a longer alkylene group in anchoring.

Example 47

The anchored rhodium complex prepared as described in Example 36 exhibited moderate activity for propylene hydroformylation. A 0.1 mm, as rhodium, portion of Example 36 consumed 115 pounds $CO/H_2$ over a 118-min. interval at a reactor temperature of 175°C.

This example demonstrates that the improved propylene hydroformylation catalytic activity of the complex $L_2Rh(CO)Cl$ where L is $\phi_2P(CH_2)_8SiCl_3$ compared to the analogous complex $L'_2RhCOCl$ where L' is $\phi_2P(CH_2)_2SiCl_3$ anchored to cab-o-sil. The increased chain length of the $L_2Rh(CO)Cl$ complex compared to the $L_2'Rh(CO)Cl$ complex clearly results in an increased hydroformylation catalytic activity of these two analogous complexes.

Example 48

The heterogeneous rhodium complex prepared as described in Example 37 was moderately active for propylene hydroformylation. A 0.1 mm, as rhodium, portion of Example 37 consumed 195 pounds $CO/H_2$ over a 151-min. interval at a reactor temperature of 145°C. The infrared spectrum of the spent catalyst of the above experiment exhibited an intense carbonyl stretching band at 1978 $cm^{-1}$, identical in intensity and frequency to the anchored phosphine rhodium carbonyl complex of Example 37. The reaction solution following isolation of the anchored catalyst by suction filtering was water white in color; therefore, the anchored rhodium phosphine complex is not removed from the silica surface under reaction conditions.

This example demonstrates the improved catalytic activity of the complex $L_3RhCl$ where L is $\phi_2P(CH_2)_8SiCl_3$ anchored to silica compared to the analogous complex $L_3'RhCl$ where L' is $\phi_2P(CH_2)_2SiCl_3$ on cab-o-sil. The increased chain length of the $L_3RhCl$ complex compared to the $L_3'RhCl$ complex clearly is the explanation for the improved hydroformylation activity observed.

Example 49

The anchored rhodium phosphine prepared as described in example 39 was an inactive propylene hydroformylation catalyst. A 0.5 mm, as rhodium, portion of example 39 gave no $CO/H_2$ uptake over a 75 minute interval with a final temperature of 175°C. This example demonstrates that the anchored rhodium-phosphine catalysts with a rhodium-phosphine ratio of 1:1 are not effective for hydroformylation with an anchored phosphine with a two carbon chain length (see example 42 and 50 for comparison).

Example 50

The anchored rhodium phosphine complex prepared as described in example 40 was an active propylene hydroformylation catalyst. A 0.5 mm, as rhodium, portion of example 40 gave a total of 1160 pounds $CO/H_2$ uptake over a 154 min. interval with a final temperature of 150°C. Normal-butyraldehyde ratio was 0.96 for the above catalyst run.. This example demonstrates that an anchored rhodium-phosphine catalyst with a rhodium-phosphine ratio of 1:1 is effective for hydroformylation. Catalytic activity is dependent on the methylene chain length (see example 49 for comparison).

Example 51

The rhodium complex prepared as described in example 41 was an active hydroformylation catalyst. A 0.5 mm, as rhodium, portion of example 41 gave a $CO/H_2$ uptake of 1070 pounds with a final temperature of 150°C. over a 149 minute interval. Normal-butyraldehyde to iso-butyraldehyde ratio was 1.07. This example demonstrates again that an anchored rhodium-phosphine catalyst with a rhodium-phosphine ratio of 1:1 is effective for hydroformylation. Catalytic activity is dependent on the use of a alkoxysilane rather than a chlorosilane coupling reagent (see example 49 for comparison).

Example 52

Preparation of $[(\phi_2P(CH_2)_2SiCl_3]_2Rh(CO)Cl$. Dichlorotetracarbonyl dirhodium, 2.80 g (7.2 mm), was dissolved in 50 ml of benzene. A 10 g portion of $\phi_2P(CH_2)_2SiCl_3$ (28.8 mm), example 13, dissolved in 50 ml benzene was added slowly with stirring to the dichlorotetracarbonyl dirodium. Reaction was evidenced by the immediate color change on mixing the two solutions from orange to light yellow with rapid gas evolution from solution. After 10 minutes of vigorous stirring, benzene was removed by vacuum drying ($5 \times 10^{-2}$ mm Hg). The residue, following vacuum drying, washed with four-5 ml portion hexane to yield 12.40 grams of the expected yellow crystalline product, $[\phi_2P(CH_2)_2SiCl_3]_2Rh(CO)Cl$, in essentially 100% yield. The yellow crystalline product had a melting point 168°–169°C., decomposing on melting to a deep red liquid. The complex $[\phi_2P(CH_2)_2SiCl_3]_2 Rh(CO)Cl$ exhibited a single strong carbonyl stretching frequency at 1977 $cm^{-1}$ compared to the $(\phi_3P)_2Rh(CO)Cl$ carbonyl stretching frequency in benzene of 1975 $cm^{-1}$. The crystalline complex was submitted for C, H, Rh, P, Cl analysis, Found: C, 40.63; H, 3.25; Rh, 12.2; P, 6.94; Cl, 28.13; Calculated $C_{29}H_{28}O,RhSi_2Cl_2P_2$ C, 40.42; H, 3.28; Rh, 11.94; P, 7.19; Cl, 28.8.

This example demonstrates the ability to prepare and isolate an $L_2Rh(CO)Cl$ complex where L is a trichlorosilyl group containing phosphine.

EXAMPLE 53

Reaction of $[\phi_2P(CH_2)_2SiCl_3]_2Rh(CO)Cl$ with dehydrated cab-o-sil. A 1.72 g portion of $[\phi_2P(CH_2)_2SiCl_3]_2Rh(CO)Cl$ (2.0 mm), example 52, was dissolved in 40 cc benzene. The benzene solution was added dropwise to 10 g dehydrated cab-o-sil with thorough grinding. Benzene was removed from the rhodium complex impregnated onto cab-o-sil by vacuum drying at ambient temperature for 1 hr at $5 \times 10^{-2}$ mm Hg vacuum pressure. The rhodium complex on cab-o-sil was then heated at 140°C. for 14 hrs. at $5 \times 10^{-2}$ mm Hg vacuum pressure. The above heat treatment eliminated hydrogen chloride gas from reaction of the chlorosilane groups with the hydroxyl groups of the silica surface as analysis of the liquid nitrogen vacuum trap from the fourteen hour heat treatment gave acid concentration equivalent to 0.25 mm chlorine per mm rhodium. Direct chemical analysis of the rhodium complex on cab-o-sil indicated 2.8 mm chlorine per mm rhodium had been removed from the cab-o-sil surface as hydrogen chloride, as shown by the following. Found: C, 6.44; H, 0.88; Rh, 1.53; P. 0.90; Cl, 2.53; calculated (determined on the assumption that the complex $[\phi_2P(CH_2)_2SiCl_3]_2Rh(CO)Cl$ was present on the cab-o-sil surface according to the concentration above, i.e., 2 mm rhodium complex/10 g cab-o-sil): C, 5.93; H, 0.48; Rh, 1.73; P, 1.06; Cl, 4.23.

The above example demonstrates again the facile reaction of a trichlorosilylated phosphine-rhodium complex with dehydrated cab-o-sil.

EXAMPLE 54

The anchored phosphine rhodium complex of example 53, as a methanol carbonylation catalyst. A 2.95 g portion of $[\phi_2P(CH_2)_2SiCl_3]_2Rh(CO)Cl$/cab-o-sil (0.5 mm as rhodium), example 53, was placed in a glass liner of a 20 cc capacity Roth autoclave with 63 ml methanol and 7 ml benzene. Methyl iodide was used as a co-catalyst and 0.25 ml was added to the above mixture. The 200 cc capacity Roth autoclave was sealed in the dry box and transferred to the hood. Magnetic stirring was used during the course of the reaction. The Roth autoclave was then pressurized with CO at ambient temperature to 250 psi. The temperature was increased to 145°C. and maintained for 17 hours. Quantitative g.c. analysis of the distilled reaction solution gave the followinig wt. percent of components; $H_2O$, 5.0; $CH_3OH$, 75.7; $CH_3CO(OCH_3)$, 10.5; $C_6H_6$, 8.8. Analysis of a portion of several catalysts following analogous methanol carbonylation run conditions using the above conditions and the same rhodium complex, example 53, demonstrate that the rhodium comples had remained affixed to the cab-o-sil surface under reaction conditions. Analysis of several spent methanol carbohylation runs with the above anchored catalyst is given to illustrate the ability of the anchored rhodium complex to function as a heterogeneous catalyst in slurry reactions without loss of the precision metal: Found: Spent catalyst from run No. A: C, 6.28; H, 0.89; Rh, 1.59; P, 0.75; Cl, 0.63; spent catalyst run No. C; C, 6.76; H, 0.84, Rh, 1.63; P, 0.95; Cl, 1.23, spent catalyst run No. G; C, 6.63, H, 1.14; Rh, 2.02; P, 0.91; Cl, 1.15; The above elemental compositions compare well with that of the starting anchored catalyst except for the decreased chlorine values.

This example when compared with the following experiment demonstrates the near equivalent methanol carbonylation activity of the anchored rhodium complex of Example 53 compared to the analogous homogeneous catalyst $(\phi P)_2 Rh(CO)Cl$, Example 55. This example also demonstrates the retention of the rhodium metal on the cab-o-sil surface under methanol carbonylation reaction conditions.

EXAMPLE 55

$(\phi_3P)_2Rh(CO)Cl$ as a methanol carbonylation catalyst. A 0.345 g amount of $(\phi_3P)_2Rh(CO)Cl$ was placed in a glass liner for a 200 cc capacity Roth autoclave with 63 ml methanol and 7 ml benzene. Methyl iodide was used as a co-catalyst and 0.125 ml was added to the above mixture. The 200 cc capacity Roth autoclave was selaed in the dry box and transferred to the hood. Magnetic stirring was used during the course of the reaction. The autoclave was then pressurized with CO at ambient temperature to 250 psi. The temperature was increased to 175°C. and maintained for 20 hrs. Quantitative g.c. analysis of the distilled reaction solution gave the following wt. percent of components: $H_2O$, 11.2; $CH_3OH$, 63.3; $(CH_3)_2O$, 3.8; $CH_3CO(OCH_3)$, 11.1; $CH_3COOH$, 0.1; $C_6H_6$, 10.5.

This example is included only to provide a comparison of the activity of a homogeneous methanol carbonylation catalyst to the heterogeneous methanol carbonylation catalyst, Example 54.

EXAMPLE 56

Blank runs of the methanol carbonylation reactor. (A) A 2.5 g amount of dehydrated cab-o-sil, example 55, was placed in a glass liner of a 200 cc capacity Roth autoclave with 45 ml methanol and 7 ml benzene. Methyl iodide (0.5 ml) was added and the Roth autoclave was sealed in the dry box and transferred to the hood. The autoclave was pressured at ambient temperature to 250 psi CO at ambient temperature. Magnetic stirring was used during the course of the reaction. Gas chromatographic analysis showed no methyl acetate was produced for a run time of 16 hours at 140°C. (B) A 0.25 ml portion of methyl iodide was placed in a 200 cc capacity Roth autoclave with 63 ml methanol/7 ml benzene. The Roth autoclave was sealed in the dry box and transferred to the hood. The autoclave was pressured to 250 psi CO at ambient temperature. The temperature was increased to 150°C. and maintained for 16 hours. Quantitative g.c. analysis gave the following weight percent; $H_2O$, 6.1; $(CH_3)_2O$, 6.0; $CH_3OH$, 75.5; $CH_3CO(OCH_3)$, 0.1; $C_6H_6$, 11.3

This example is included only to provide a demonstration that cab-o-sil and methyl iodide, or methyl iodide in the absence of cab-o-sil are not catalytic for methanol carbonylation under the reaction conditions employed in Examples 54 and 55.

EXAMPLE 57

The anchored phosphine of Example 53 exposed to benzene Soxlet extraction and concentrated acetic acid at 150°C. To establish that the anchored phosphine rhodium complex of Example 54 would remain intact as a heterogeneous phase in the presence of various liquid phases, the following experiments wave executed: (A) A portion of the anchored phosphine rhodium complex of Example 54 was heated for 2 hours at 150°C. in 100 ml concentrated acetic acid in a 200 cc capacity Roth autoclave. The above acetic acid solution was suction filtered through a fine glass filter frit in a nitrogen purged dry box and washed with two-50 ml portion benzene. The residue was vacuum dried for 1 hour at ambient temperature at $5 \times 10^{-2}$ mm Hg vacuum. The dried anchored rhodium complex on cab-o-sil was submitted for C, H, Rh, P, Cl analysis. Found: C, 7.10; H, 0.93; Rh, 1.67; P, 0.95; Cl, 1.43; Calculated (as in Example 53) C, 5.93, H, 0.48, Rh, 1.73; P, 1.03, Cl, 4.23. (B) A portion of the anchored phosphine rhodium comples of Example 53 was Soxlet extracted with benzene under a nitrogen purge for 19 hours. Following vacuum drying the rhodium complex on cab-o-sil was submitted for C, H, Rh, P, Cl analysis Found: C, 5.97; H. 0.70; Rh, 1.70; P. 1.03; Cl, 1.47.

This example demonstrates the retention of the anchored phosphine complex on the cab-o-sil surface under continuous benzene refluxing and heating with concentrated acetic acid at 150°C.

EXAMPLES 58–71

Catalysis of Cyclohexene Hydrogenation. Hydrogenation of cyclohexene was investigated for a number of anchored rhodium phosphine complexes of the formula $L_xRhCl$, where $x = 1, 2, 3$ and where L is a trichlorosilylated phosphine chemically affixed to cab-o-sil, in order to establish the sensitivity of the hydrogenation reaction rate to coordinate number about the metal and to the type of phosphine. The active homogeneous hydrogenation catalyst $(\phi_3P)_3RhCl$ was used as comparison to the anchored rhodium phosphine catalyst investigated. Standard cyclohexene hydrogenation conditions were determined by investigating the activity of 0.125 mm $(\phi_3P)_3RhCl$ catalyst in 50 ml of 1M solution of cyclohexene (dried over sodium metal and stored under nitrogen) in benzene. The catalyst concentration was 2.5 mM in rhodium catalyst. All hydrogenation reactions were investigated at a constant hydrogen pressure of 50 psig. The temperature of hydrogen uptake of about 1 psig per minute was determined for each catalyst. All of the hydrogenation reactions were investigated using a 300 cc capacity Fisher high pressure reaction bottle equipped with pressure gauge and gas inlet and outlet valves.

EXAMPLE 58

Cyclohexene hydrogenation activity of the anchored rhodium phosphine complex of Example 38 where Rh:P ratio is 1:1. The catalyst benzene mixture was clear and light yellow in color. A reaction rate of 1 psig $H_2$/min. was observed at 115°C. The reaction mixture was taken into a nitrogen purged dry box and suction filtered with a fine sintered glass filter frit. The residue was washed with 100 ml benzene and recharged for another hydrogenation run. The reaction solution was clear and light grey in color. The hydrogenation rate of the recycled catalyst was the same as the initial hydrogenation rate. The reaction mixture was taken into a nitrogen purged dry box and suction filtered through a fine sintered glass filter frit. The residue was washed with 100 ml benzene and recharged for another hydrogenation run following exposure of the reaction mixture to 50 psi carbon monoxide for 15 minutes with vigorous stirring. The carbon monoxide was vented and the reactor was represented with 50 psig $H_2$. The exposure of the hydrogenation catalyst to carbon monoxide completely inhibited catalytic hydrogenation activity of cyclohexene up to a temperature of 157°C.

This example demonstrates that the anchored rhodium phosphine complex of example 38 with Rh:P ratio of 1:1 can be repeatedly recycled without decrease in catalytic dehydrogenation activity. This example also demonstrates the poisoning effect of carbon monoxide on the catalytic hydrogenation activity of the anchored rhodium catalyst. Carbon monoxide poisoning was also observed for rhodium black, example 68 and $(\phi_3P)_3RhCl$, Example 67. This example provides a comparison between the catalytic hydrogenation activity of the above anchored catalyst with a Rh:P ratioi of 1:1 and the anchored catalyst of example 59 with a Rh:P ratio of 1:3. The catalytic hydrogenation activity is greater for the latter catalyst. This example also provides a comparison between the catalytic hydrogenation activity of anchored rhodium catalysts prepared by different techinques. The in situ preparation of the anchored rhodium catalyst of example 61 with a Rh:P ratio of 1:1 is significantly more active than the catalyst of this example prepared as described in example 38.

EXAMPLE 59

Cyclohexene hydrogenation activity of the anchored rhodium phosphine complex of Example 37 where the Rh:P ratio is 1:3. The catalyst/benzene mixture was clear and light yellow in color. A reaction rate of 1 psig $H_2$/min was observed at 70°C. The reaction mixture was taken into a nitrogen purged dry box and suction filtered with a fine sintered glass filter frit. The residue was washed with 100 ml benzene and recharged for another hydrogenation run. The initial reaction solution and the benzene wash were water white in color. The catalyst reaction mixture was clear and yellow brown in color. The reaction rate of the recycled catalyst was the same as the previous hydrogen rate. The reaction mixture was again taken into a nitrogen purged dry box and suction filtered with a fine sintered glass suction frit. The residue was washed with 100 ml benzene and recharged for another hydrogenation run. The hydrogenation rate of the twice recycled catalyst was the same as the initial hydrogenation rate, i.e., 1 psig $_2$/min.

at 70°C. The reaction was stopped after a total hydrogen absorption of 36 psig. A 1.0 g portion of mercury metal was added to the reaction mixture in a nitrogen purged dry box and the temperature was increased to 90°C. over 105 min. following pressuring with hydrogen to 50 psig. The hydrogen uptake was only 9 psig over 105 min.

This example demonstrates that mercury metal has a detrimental effect on the hydrogenation activity of the above anchored rhodium catalyst. Mercury metal poisoning of the catalytic hydrogenation activity was also observed for rhodium black, Example 69, but was not observed from the homogeneous catalyst $(\phi_3P)_3RhCl$, of Example 66. The anchored catalyst was, therefore, shown to parallel a heterogeneous hydrogenation catalyst's sensitivity toward mercury metal poisoning. This example also shows that the catalytic hydrogenation activity of the above anchored catalyst with a Rh:P ratio of 1:3 is greater than that of the anchored catalyst of Example 98 with a Rh:P ratio of 1:1.

EXAMPLE 60

Cyclohexene hydrogenation activity of $L_3RhCl$ produced by in situ reaction where L is $100\ _2P)CH_2)_8SiCl_3$ affixed to cab-o-sil. A 1.10 (0.375 mm as phosphine) portion of the anchored phosphine of Example 35 was mixed with 0.031 g [1,5-cyclooctadiene rhodium chloride]$_2$ (0.0625 mm) in 45 ml benzene. A 5.06 ml portion of cyclohexene (1.0M final concentration) was then added to the mixture. The hydrogenation reaction rate of the above catalyst was 1 psig H$_2$/min. at 75°C. This example demonstrates the near equivalent catalytic hydrogenation activity of the anchored rhodium catalysts $L_3RhCl$ and $L_3'RhCl$ where L is $\phi_2P(CH_2)_2SiCl_3$ affixed to cab-o-sil, Example 64 and L' is $\phi_2P(CH_2)_8SiCl_3$ affixed to cab-o-sil. This example also demonstrates the equivalent catalytic hydrogenation activity of the anchored rhodium catalysts $L_3RhCl$ where L is $\phi_2P(CH_2\ )_8SiCl_3$ for differing catalyst preparations. The above in situ prepared anchored catalyst has a comparable activity to that of the similar but isolated catalyst of Example 59.

EXAMPLE 61

Cyclohexene hydrogenation activity of [L(1,5-cyclooctadiene)RhCl] produced by in situ reaction with $\phi_2P(CH_2)_8SiCl_3$ affixed to cab-o-sil. A 0.367 g (0.125 mm as phosphine) portion of Example 35 was mixed with 0.031 g 1,5-cyclooctadiene rhodium chloride dimer (0.0625 mm) in 45 ml benzene. A 5.06 ml portion of cyclohexene (1.0M final concentration) was then added to the mixture. The hydrogenation reaction rate of the above catalyst was 1 psig H$_2$/min at 90°C. The reaction was stopped after a hydrogen uptake of 31 psig. The reactor was vented and 5.06 ml of cyclohexene was added in a nitrogen purged dry box. The reactor was represented with 50 psig H$_2$ and an uptake of hydrogen at a rate of 1 psig/min at 70°C waas observed. The reaction was stopped after a hydrogen uptake 22 psig. The reactor was vented and pressured with carbon monoxide at 50 psig for 15 min. with rapid stirring of the reaction mixture. The carbon monoxide was vented and the reactor was repressured with 50 psig H$_2$. The catalyst above was inactive for cyclohexene hydrogenation up to a temperature of 150°C.

This example demonstrates near equivalent catalytic activity of the above catalyst to the analogous anchored catalyst with a phosphine affixed to the cab-o-sil surface by a two carbon chain length. Example 65. This example also demonstrates the increased catalytic activity of the above in situ prepared anchored rhodium catalyst compared to the analogous anchored rhodium catalyst of Example 58 where the rhodium phosphine complex anchored to cab-o-sil was isolated. This example also demonstrates the poisoning effect of carbon monoxide on the catalyst activity of the in situ preparation of the anchored catalyst of this example.

EXAMPLE 62

Cyclohexene hydrogenation activity of [L$_2$ rhodium chloride] produced by in situ reaction where L is $\phi_2(CH_2)_8SiCl_3$ affixed to cab-o-sil. A 0.73 g portion of Example 35 (0.375 mm anchored phosphine) was mixed with a 0.031 g 1,5-cyclooctadiene rhodium chloride dimer (0.0625 mm) in 45 ml benzene. A 5.06 ml portion of cyclohexene (1.0M final concentration) was then added to the mixture. The hydrogenation reaction rate of the above catalyst was 1 psig H$_2$/min at 95°C.

The above example demonstrates the sensitivity of reaction rate of an anchored rhodium complex to the phosphine to rhodium ratio, i.e., the above catalyst with a 2:1 phosphine to rhodium ratio is a less active hydrogenation catalyst than the catalyst of Example 60 with a 3:1 phosphine to rhodium ratio.

EXAMPLE 63

Cyclohexene hydrogenation activity of [L-$_3$-rhodium chloride] produced by in situ reaction where L is $\phi_2P(CH_2)_2SiCl_3$ affixed to cab-o-sil. A 1.07 g portion of example 30 (0.375 mm phosphine) was mixed with 0.031 g [1,5-cyclooctadiene rhodium chloride]$_2$ (0.0625 mm) in 45 ml benzene. A 5.06 mll portion of cyclohexene (1.0M final construction) was then added to the mixture. The hydrogenation reaction rate of the above catalyst was 1 psig H$_2$/min at 70°C.

This example demonstrates the equivalent catalytic hydrogenation activity of the heterogeneous rhodium catalysts $L_3RhCl$ and $L_3'RhCl$ where L is $\phi2P(CH_2)_2SiCl_3$ affixed to cab-o-sil and L' is $\phi_2P(CH_2)_8SiCl_3$ affixed to cab-o-sil.

EXAMPLE 64

Cyclohexene hydrogenation activity of L(1,5-cyclooctadiene) rhodium chloride produced by in situ reaction where L is $\phi_2P(Ch_2)_2SiCl_3$ affixed to undehydrated cab-o-sil at saturation coverage. A 0.17 g portion of Example 31 (0.125 mm phosphine) was mixed with 0.31 g [1,5-cyclooctadiene rhodium chloride]$_2$ (0.0625 mm) in 45 ml benzene. A 5,06 ml portion of cyclohexene (1.0M final concentration) was then added to the mixture. The hydrogenation reaction rate of the above catalyst was 1 psig H$_2$/min. at 120°C. The reaction was stopped after a hydrogen uptake of 31 psig. The reactor was vented and pressured with carbon monoxide at 50 psig for 15 min. with rapid stirring of the reaction mixture. The carbon monoxide was vented and the reactor was repressured with 50 psig H$_2$. The resulting carbonylated anchored rhodiu, catalyst above was inactive for cyclohexene hydrogenation up to a temperature of 150°C.

This example demonstrates the catalytic hydrogenation activity of an anchored rhodium phosphine comples with a phosphine affixed to the cab-o-sil surface by a two carbon chain length. This example also demonstrates the near equivalent catalytic hydrogenation activity of the above heterogeneous catalyst to the anchored catalyst with a phosphine affixed to the cab-o-sil surface by an eight carbon chain length, Example 58. This example also demonstrates the catalytic hydrogenation activity of an anchored complex prepared from a completely phosphine covered silica surface, Example 31 (see also Example 32). This example also demonstrates the poisoning effect of carbon monoxide on the hydrogen activity of the above rhodium catalyst.

EXAMPLE 65

Cyclohexene hydrogenation activity of L(1,5-cyclooctadiene) RhCl produced by in situ reaction with $\phi_2P(CH_2)_2SiCl_3$ affixed to cab-o-sil. A 0.356 g (0.125 mm as phosphine) portion of Example 30 was mixed with 0.031 g 1,5-cyclooctadiene rhodium chloride dimer (0.625 mm) in 45 ml benzene. A 5.06 ml portion of cyclohexene (1.0 M final concentration) was then added to the mixture. The hydrogenation reaction rate of the above catalyst was 1 psig $H_2$/min at 80°C. The reaction was stopped after a hydrogen uptake of 40 psig. The reaction mixture was taken into a nitrogen purged dry box and suction filtered with a fine sintered glass filter frit. The residue was washed with 100 ml benzene and recharged for another hydrogenation run. The filtered initial reaction solution had a yellow color indicating complete metal phosphine reaction had not been achieved. The benzene wash was water white in color however. The catalyst/reaction mixture was clear and yellow brown in color. The reaction rate of the recycled catalyst was 1 psig $H_2$/min. at 65°C. This reaction mixture was taken again into a nitrogen purged dry box and suction filtered with a fine sintered glass filter frit. The residue was washed with 100 ml benzene and recharged for another hydrogenation run. This reaction solution and benzene wash were water white in color. The reaction rate of the recycled catalyst was 1 psig $H_2$/min at 65°C. This reaction was stopped after a hydrogen uptake of 87 psig hydrogen.

This example demonstrates near equivalent initial catalytic activity of the above catalyst compared to the analogous anchored catalyst with a phosphine affixed to the cab-o-sil surface by an eight carbon chain length, Example 61.

This example also demonstrates the increased catalytic activity of the above catalyst compared to the analogous rhodium catalyst with a completely phosphine saturated cab-o-sil surface, Example 64. This example also demonstrates the ability to recycle the above catalyst.

EXAMPLE 66

Cyclohexane hydrogenation activity of $(\phi_3P)_3RhCl$ and the hydrogenation activity in presence of mercury metal. The homogeneous catalyst $(\phi_3P)_3RhCl$ exhibited a reaction rate of 1 psig $H_2$/min. at 55°C. The reaction was stopped after a total hydrogenation consumption of 22 psig hydrogen. A 1.0 g portion of mercury metal was added with thorough mixing to the reaction solution in a nitrogen purged dry box and the reactor was repressured to 50 psig hydrogen. The reaction rate of 1 psig $H_2$/min. at 60°C. was observed for the homogeneous catalyst $(\phi_3P)_3RhCl$ in the presence of mercury metal. This example is provided only as a comparison to the anchored catalysts of previous examples. It demonstrates the insensitivity of the homogeneous hydrogenation catalyst $(\phi_3P)_3RhCl$ to poisoning by mercury metal.

EXAMPLE 67

Cyclohexene hydrogenation activity of $(\phi_3P)_3RhCl$ and the hydrogenation activity after exposure to carbon monoxide. The homogeneous hydrogenation catalyst $(\phi_3P)_3RhCl$ exhibited a reaction rate of 1 psig $H_2$/min. at 55°C. The reaction was stopped after a total hydrogen consumption of 20 psig. Hydrogen was vented from the reactor and the reactor was pressured to 50 psig with carbon monoxide for 15 min, with vigorous stirring of the reaction solution. The carbon monoxide was vented from the reactor and the reactor was pressured with 50 psig $H_2$. The homogeneous catalyst was inactive for cyclohexene hydrogenation up to a temperature of 120°C. This example serves to demonstrate the poisoning effect of carbon monoxide on the hydrogenation activity of the homogeneous catalyst $(\phi_3P)_3RhCl$ and is provided only as a comparison to the anchored catalysts of previous examples.

EXAMPLE 68

Hydrogenation of cyclohexene using rhodium black and the hydrogenation activity after exposure to carbon monoxide. The heterogeneous rhodium black catalyst exhibited a cyclohexene hydrogenation rate of 1 psig/min at 50°C. The reaction was stopped after a hydrogen consumption of 10 psig. Hydrogen was vented from the reactor and the reactor was pressured to 50 psig with carbon monoxide for 15 min. with vigorous stirring of the reaction mixture. The carbon monoxide was vented from the reactor and the reactor was pressured with 50 psig $H_2$. The temperature was increased to 151°C. in 105 min. without hydrogen uptake. This example is provided only as a comparison to the anchored catalysts of previous examples. It demonstrates the poisoning effect of carbon monoxide on the catalytic hydrogenation activity of rhodium black.

EXAMPLE 69

Hydrogenation of cyclohexene using rhodium black and the hydrogenation activity after exposure to mercury metal. The heterogeneous rhodium black catalysts exhibited an initial hydrogenation ratio of 3 psi/min. at 50°C. The reaction was stopped after a hydrogen consumption of 30 psig. A 0.625 mm quantity of mercury metal was added to the reaction mixture in a nitrogen purged dry box. The reactor was repressured with hydrogen to 50 psig. The reaction rate was 1 psig/min. at 60°C. The reaction was stopped and 0.5 g mercury metal was added to the catalyst mixture again in a nitrogen purged dry box. The reactor was repressured with hydrogen to 50 psig. The temperature was increased to 125°C. in 46 minutes without hydrogen uptake. This example demonstrates the poisoning effect of mercury metal on the hydrogenation activity of rhodium black. It is provided only as a comparison to the anchored catalysts of previous examples.

Example 70

Hydrogenation of cyclohexene using 1,5 cyclooctadiene rhodium chloride dimer. Before an investigation of the cyclohexene hydrogenation activity of in situ preparations of $L_3RhCl$, $L_2RhCl$, and LRhCl where L is the phosphine chemically affixed to cab-o-sil, it was important to determine if the rhodium diolefin complex had cyclohexene hydrogenation activity in the absence of coordinating phosphine.

The rhodium complex, 1,5 cyclooctadiene rhodium chloride dimer, exhibited a reaction rate of 1 psig $H_2$/min. at 75°C. Raising the reaction temperature above 100°C. resulted in deposition position of a rhodium mirror on the reactor walls and loss of hydrogenation activity. However, when the reaction was repeated there was no evidence of decomposition of the above rhodium complex below 75°C. Hydrogen was vented and the reactor was pressured to 50 psig with carbon monoxide for 15 min. with vigorous stirring of the reaction solution. The carbon monoxide was vented from the reactor and the reactor was pressured with 50 psig $H_2$. The homogeneous catalyst was inactive for cyclohexene hydrogenation up to a temperature of 100°C.

This example establishes the heretofore unreported homogeneous hydrogenation activity of 1,5-cyclooctadiene rhodium chloride dimer. It is provided only as a comparison to the anchored catalysts of previous examples. This example also serves to establish the poisoning effect of carbon monoxide on the hydrogenation activity of this homogeneous hydrogenation activity.

Example 71

Hydrogenation of cyclohexene using 1,5-cyclooctadiene rhodium chloride dimer in the presence of dehydrated cab-o-sil. The homogeneous hydrogenation catalyst 1,5-cyclooctadiene rhodium chloride dimer, example 64, exhibited a reaction rate of 0.365 psig $H_2$/min. at 100°C. The mixture was a grey color at this temperature. The reaction was stopped after a total hydrogen consumption of 13 psig. The hydrogen was vented from the reactor and the reactor was pressured to 50 psig with carbon monoxide for 15 min. with vigorous stirring of the reaction solution. The carbon monoxide was vented from the reactor and the reactor was pressurized with 50 psig $H_2$. The homogeneous catalyst was inactive for cyclohexene hydrogenation up to a temperature of 100°C.

This example is provided only as a comparison to the anchored catalysts of the previous examples. This example demonstrates the significant reduction of the hydrogenation activity of 1,5 cyclooctadiene rhodium chloride dimer by dehydrated cab-o-sil, see Example 66. It also demonstrates the poisoning effect of carbon monoxide on the 1,5 cyclooctadiene rhodium chloride complex in the presence of cab-o-sil.

Examples 72 – 80

Mercurial Carbonylation Catalysis with Anchored Catalysts. The reaction of organomercurials with carbon monoxide in the presence of appropriate alcohol to form carboxylic acid derivatives was investigated for a series of anchored palladium and rhodium complexes. All reactions were carried out in a 45 ml stainless steel Parr Reactor equipped for magnet stirring. The temperature of the Parr Reactor was maintained constant by suspension in a temperature regulated oil bath. Standard conditions for each catalyst run were: 4.0 mm phenylmercuric trifluoroacetate, 0.04 mm palladium or rhodium catalyst, 20 ml methanol, 300 psig CO, 75°C., and 0.5 hr. reaction time. The conversion to methyl benzoate was determined by gas chromotography.

Example 72

Preparation of anchored $\phi_2P(CH_2)_8SiCl_3Pd$ (acetylacetonate)$_2$. A 4.86 g portion of $\phi_2P(CH_2)_8SiCl_3$ (1.66 mm as phosphine anchored to cab-o-sil, Example 35) was mixed with 60 ml benzene and added to a solution of a 5.1 g palladium bis-acetylacetonate (1.66 mm) dissolved in 20 ml benzene. The mixture was stirred for one-half hour. Benzene was removed at ambient temperature for 4 hours at $5 \times 10^{-2}$ mm Hg vacuum pressure. A sample of the dried palladium phosphine complex was submitted for C, H, Pd, P, and Cl analysis. Found: C, 10.37; H, 1.34; Pd, 2.35; P, 1.02; Cl, 1.51; Calculated (based on the assumption that the product of the reaction is $[\phi_2P(CH_2)_2SiCl_3]Pd(C_5H_7O_2)_2$; C, 11.31; H, 1.26; Pd, 3.34; P, 0.97; Cl, 3.34. Because of the lower experimental palladium analysis than expected for the 1:1 phosphine to palladium complex, a portion of the above complex was refluxed for 15 min. in benzene. The mixture was suction filtered through a fine sintered glass frit and the residue was dried at ambient temperature for 2 hours at $5 \times 10^{-2}$ mm Hg vacuum pressure. A portion of the above dried complex on cab-o-sil was submitted for C, H, Pd analysis. Found: C, 9.57; H, 1.28; Pd, 2.26. Calculated (based on the assumption that the product of the reaction is $[\phi_2P(CH_2)_2SiCl_3]Pd(C_5H_7O_2)_2$; C, 11.31; H, 1.26; Pd, 3.34; P, 0.97; Cl, 3.34..This example demonstrates the formation of a heterogeneous palladium complex by reaction of palladium bis-acetylacetonate and the phosphine $\phi_2P(CH_2)_8SiCl_3$ affixed to the cab-o-sil surface, example 35 . This example also serves to demonstrate the retention of palladium of the above complex on the cab-o-sil surface following refluxing of the complex in benzene solution.

Example 73

Preparation of $[\phi_2P(CH_2)_8SiCl_3]_2PdCl_2$. A 4.44 g portion of 100 $_2P(CH_2)_8SiCl_3$ (10.3 mm) of Example 23 was added dropwise to a magnetically stirred suspension of 1.97 g bisbenzonitrile palladium (II) chloride (4.15 mm) in 50 ml benzene. The mixture was stirred rapdily for one-half hour. The benzene was removed at ambient temperature at $5 \times 10^{-2}$ mm Hg vacuum pressure for 38 hours to yield a light yellow viscous liquid. Analysis calculated for $C_{40}H_{26}P_2Si_2Cl_8Pd$: C, 48.00; H, 5.24; Pd, 10.63; P, 6.19; Cl, 28.34. Found: C, 45.56; H, 4.65; Pd, 8.98; P, 5.76; Cl, 24.89. This example demonstrates the preparation and isolation of a trichlorosilylated phosphine palladium complex.

Example 74

Reaction of the phosphine-palladium complex of Example 73 with dehydrated cab-o-sil. A 1.04 g portion of $[\phi_2P(CH_2)_8SiCl_3]_2PdCl_2$ (1.0 mm) of Example 73 was dissolved in 20 ml benzene and added in four-5 ml portions to 5 g dehydrated cab-o-sil with thorough grinding between each addition. The benzene was removed at ambient temperature at $5 \times 10^{-2}$ mm Hg vacuum pressure for 2 hours. The impregnated complex on cab-o-sil was then heated at 145°C. for 15 hours at $5 \times 10^{-2}$ mm Hg vacuum pressure. A portion of the heat-treated complex on cab-o-sil was submitted for C, H, Pd, P, Cl analysis. Found: C, 8.47; H, 0.72; Pd, 1.73; P, 1.08; Cl, 1.84. Calculated (assuming the complex $[\phi_2P(CH_2)_8SiCl_3]_2PdCl_2$ was unreacted on the cab-o-sil surface); C, 7.95; H, 0.87; Pd, 1.76; P, 1.02; Cl,

Example 75

Preparation of [φ₂P(CH₂)₈SiCl₃](φCN)PdCl₂ in situ and its reaction with dehydrated cab-o-sil. A 0.43 g portion of 10φ₂P(CH₂)₈SiCl₃ (1.0 mm) of Example 23 was added slowly with stirring to a mixture of 0.384 (C₆H₅CN)₂PdCl₂ (1.0 mm) in 40 ml benzene. The solution was allowed to stir for 1 hour. The solution was then added in eight-5 ml portions to 5.0 g dehydrated cab-o-sil. Benzene was removed at ambient temperature for 16 hours at $5 \times 10^{-2}$ mm Hg vacuum pressure. A sample was submitted for C, H, N, Pd, Cl analysis. Found: C, 9.47; H, 1.04; N, 0.44; Pd, 1.64; P, 0.94; Cl, 2.58; Calculated (assuming the complex φ₂P(CH₂)₈SiCl₃ (φCN)PdCl₂ was unreacted on the cab-o-sil surface: C, 5.68; H, 0.55; N, 0.24; Pd, 1.86; P, 0.54; Cl, 3.10. The above heterogeneous palladium complex was heat-treated at 140°C. for 18 hours at $5 \times 10^{-2}$ mm Hg vacuum pressure. A portion of the anchored palladium complex was submitted for C, H, N, Pd, Cl analysis. Found: C, 7.43; H, 1.05; N, 0.30; Pd, 1.73; P, 0.86; Cl, 2.39. Calculated (assuming the complex [φ₂P(CH₂)₈SiCl₃] (φCN)PdCl₂ was reacted on the cab-o-sil surface) C, 5.68; H, 0.55; N, 0.24; Pd, 1.86; P, 0.54; Cl, 3.10. The above example again demonstrates the preparation in situ of a phosphine-palladium complex with a 1:1 phosphine to palladium ratio and impregnation onto dehydrated cab-o-sil below the point of incipient wetness of cab-o-sil to yield an anchored palladium phosphine complex.

Example 76 — Mercurial carbonylation catalysis with the anchored rhodium catalyst of Example 36

The anchored rhodium complex of Example 36, [φ₂P(CH₂)₈SiCl₃]₂Rh(CO)Cl, gave a phenylmercuric trifluoroacetate to methyl benzoate conversion of 20%. This example demonstrates the catalytic activity of an anchored rhodium phosphine complex for mercurial carbonylation. This example also demonstrates the greater catalytic activity of the above anchored rhodium complex with a phosphone ligand with an eight carbon chain length affixed to the silica surface compared to the analogous rhodium complex with a phosphine ligand with only a two carbon chain length affixed to the silica surface.

Example 77 — Mercurial carbonylation catalysis with the anchored rhodium catalyst of Example 33

The anchored rhodium complex of Example 33, [φ₂P(CH₂)₂SiCl₃]₂Rh(CO)Cl, gave a methyl benzoate conversion of 6%. This example demonstrates the catalytic activity of an anchored rhodium complex for mercurial carbonylation. This example also demonstrates the lesser catalytic activity of the above anchored rhodium complex with a phosphine ligand with a two carbon chain length compared to the analogous rhodium complex with a phosphine ligand with an eight carbon chain length affixed to the silica surface.

Example 78 — Mercurial carbonylation catalysis with the anchored palladium catalyst of Example 72

The anchored palladium complex of Example 72, [φ₂P(CH₂)₈SiCl₃]Pd (acetylacetonate)₂, gave a methyl benzoate conversion of 12%. This example demonstrates the catalytic activity of an anchored palladium-phosphine complex for mercurial carbonylation. This example also demonstrates the lesser catalytic activity of an anchored palladium acetylacetonate catalyst compared to an analogous palladium chloride complex.

Example 79 — Mercurial carbonylation catalysis with the anchored palladium catalyst The anchored palladium complex of Example 75, [φ₂P(CH₂)₈SiCl₃] (φCN)PdCl₂, anchored to cab-o-sil gave a methyl benzoate conversion of 30%. This example demonstrates the catalytic activity of an anchored palladium-phosphine complex for mercurial carbonylation. This example also demonstrates the greater catalytic activity of the above anchored palladium phosphine chloride complex with a P:Pd ratio of 1:1 compared to the analogous complex with a P:Pd ratio of 2:1, Example 80.

Example 80 — Mercurial carbonylation catalysis with the anchored palladium catalyst The anchored palladium complex of Example 73, [φ₂P(CH₂)₈SiCl₃]₂PdCl₂, anchored to cab-o-sil gave a methyl benzoate conversion of 20%. This example demonstrates the catalytic activity of an anchored palladium-phosphine complex for mercurial carbonylation. This example also demonstrates the lesser catalytic activity of the above anchored palladium phosphine chloride comlex with a P:Pd ratio of 2:1 compared to the analogous complex with a P:Pd ratio of 1:1, Example 79.

CATALYSIS OF HEXENE HYDROFORMYLATION BY ANCHORED PHOSPHINE-COBALT COMPLEXES:

Example 81 — Anchoring of the Bis-[β-(Trichlorosilyl)ethyl] Phenyl Phosphine on Silica The chlorosilylated phosphine (2.17 g, 5 mm) was dissolved in 35 ml of benzene and added slowly with manual mixing to 5 grams (7.5 mm equivalents of silanol) of the cab-o-sil which was contained in a beaker. The impregnated cab-o-sil was then transferred to the dessicator-type vessel and transferred under nitrogen to the high-vac line. The benzene was then removed at room temperature in vacuo; the residue was kept at a pressure of $10^{-4}$ mm for 12 hours. The residual impregnated cab-o-sil was warmed in about 15 minutes to 100°C. At about 80°C the pressure in the vacuum system increased indicating the evolution of the HCl by-product of the anchoring reaction. Heating was continued at 100°C for 24 hours. Chlorine analysis of the above treated cab-o-sil gave 4.07% chlorine. The expected quantity of chlorine based on the unreacted phosphine was 14.9%. Therefore, one-third of the chloroethyl groups of the phosphine must have reacted with the silanol groups of cab-o-sil.

Example 82 — Preparation of the Cobalt Carbonyl Complex of β-(Trichlorosilyl) Ethyl Diphenyl Phosphine

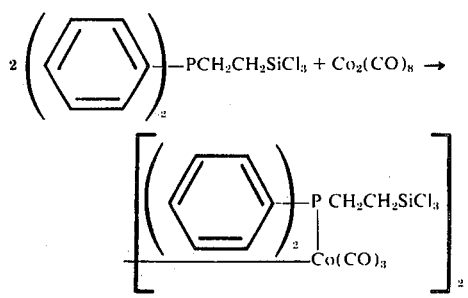

6.35 g (18.6 mm) of Co₂(CO) was slurried in 80 ml of benzene in a 500 ml round bottom flask. Then 9.5 g (37.3 mm) of the phosphine in 50 ml of benzene was added in small aliquots to the above mixture. During the addition, a vigorous evolution of carbon monoxide was observed. After the addition the heterogeneous mixture was refluxed for an additional 4 hours. The flask was stoppered and allowed to stand overnight. The mixture was filtered with suction using a 10–20 μ pore diameter filtered glass funnel to remove the unreacted cobalt carbonyl. The residue was washed with benzene and 5 ml of hexane. The combined filtrates were stripped of solvent using a roto-vac to obotain the yellow crystalline residual product. The infrared spectrum (IR) of the complex showed only carbonyl bands expected for an Co₂(CO)₆L₂ complex at 2025, 1985, and 1960 cm⁻¹.

Analyses calculated for $C_{34}H_{28}P_2Si_2Cl_6O_6Co_2$: C, 41.64; H, 2.85; P, 6.22; Co 12.03. Found: C, 36.47; H, 2.57; P, 5.77.

Example 83 — Preparation of the Cobalt Carbonyl Complex of Bis-[β-(Trichlorosilyl)]Ethyl Phenyl Phosphine

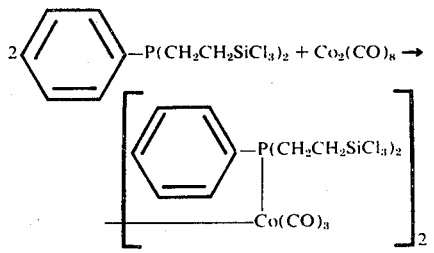

5.95 g (17.3 mm) of Co₂(CO)₈ was added to 80 ml of benzene in a 500 ml round bottom flask equipped with a magnetic stirrer. Then 15 g (34.7 mm) of the phosphine were reacted in the manner described in the previous example. A yellow-brown crystalline product was obtained. An IR analysis of the product gave the expected carbonyl stretching frequencies for an CO₂(CO)₆L₂ complex at 2020; 1990, and 1960 cm⁻¹. The nmr analysis showed the expected α-methylene splitting pattern of the phosphine complex.

Analyses: Calculated for $C_{26}H_{26}P_2Si_4Cl_2O_6Co_2$: C, 27.11; H, 2.26; P, 5.30; Co, 10.24. Found: C, 25.24; H, 2.29; P, 5.05.

Example 84 — Anchoring of the Cobalt-Carbonyl-Phosphine Complex 4.9 g (5 mm) of Co₂(CO)₆ (φ₂P CH₂CH₂SiCl₃)₂ was dissolved in the minimum volume of benzene. The resulting solution was added dropwise with thorough mixing to 5 g of cab-o-sil. The cab-o-sil impregnated as described above was placed in a 500 ml round bottom flask and evacuated and heated at 140°C for 2 hours at 10⁻² mm Hg to remove benzene and hydrogen chloride.

Analyses: Calculated: P, 3.08; Co, 5.97. Found: P, 2.18; Co, 6.85.

Example 85 — Reaction of Anchored Cobalt-Carbonyl Phosphine Complex with 1-Hexene and Water 20 ml 1-hexene (18 mm) and 3.24 ml H₂O (18 mm) and enough tetrahydrofuran to make the mixture homogeneous were placed in a reactor vessel equipped with a side arm and teflon stopcock. In the dry box 1.4 g of supported cobalt carbonyl phosphine complex of Example 84 was added to the mixture. The reaction vessel was then closed and heated at 100°C for 14 hrs. The vessel was then allowed to cool and a sample for g.c. analysis was taken under a nitrogen purge. The anchored catalyst had not undergone any visible change under the above reaction conditions. The g.c. spectrum of the above reaction solution indicated the absence of alcohols, but indicated isomerization of the 1-hexene. The closed reaction vessel was then allowed to react for 3 hrs at 200°C. The anchored cobalt phosphine carbonyl underwent a gradual visible change from light tan to silver during the heating. The vessel was allowed to cool and a sample for g.c. analysis was taken again under nitrogen purge. The g.c. spectrum of the above solution showed no differences compared to that of the 100°C reaction condition.

Analysis of anchored catalyst following above reaction: Calculated: P, 3.08. Found: P, 1.81. Analysis of the liquid product mixture for phosphorus gave a value of 110 ppm.

Example 86 — Oxo-Type Reaction of 1-Hexene Catalyzed by the Anchored Catalyst of Example 84

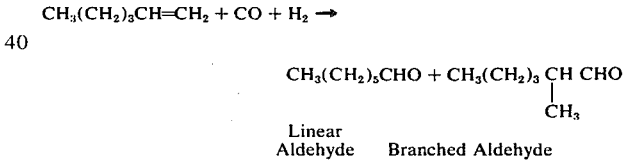

Linear Aldehyde   Branched Aldehyde

Into a rocking autoclave were placed 1.5 g of the anchored catalyst of Example 84 and 20 ml of 1-hexene reactant together with 15 ml cyclohexane solvent. This resulted in a reaction mixture containing 1 millimole of catalyst per mole of olefin. The autoclave was then pressured up to 3000 lbs per in² pressure with a 2 to 1 pressure ratio of hydrogen and carbon monoxide co-reactants. The temperature was then raised to 200°C wherein a sharp drop in the pressure indicated that an extremely rapid reaction has occurred. In 15 minutes about 92% of the hexene was converted. Six percent of the reacted olefin was hydrogenated. The rest yielded oxygenated oxo-type products. The oxo-product mixture had a 95 to 5 aldehyde to alcohol ratio and 55% product linearity according to analyses by gas liquid chromatography.

Analysis of the liquid product mixture for phosphorus gave a value less than 20 ppm. Infrared spectroscopy of the carbonyl region indicated the presence of only trace quantities of cobalt carbonyl or cobalt carbonyl phosphine complex. Analysis of anchored catalyst following above reaction: Calculated: P, 3.08, Co, 5.95. Found: P, 1.91, Co, 6.85.

What is claimed is:

1. A method for the preparation of silylalkyl phosphines comprising the step of selectively reacting phosphines of the formula $$R'_{3-x}PH_x$$

wherein R' is $C_1$ to $C_4$ alkyl, cyclohexyl and phenyl and x is an integer ranging from 1 to 3, with ω-alkenyl silanes of the formula:

$$R_{4-y}Si[(CH_2)_lCH=CH_2]_y$$

wherein R is chlorine, $C_1$ to $C_6$ hydrocarbyl providing that at least one of the R groups is chlorine; y is 1 or 2 and l is 3 to 32, at temperatures between −100° and +16°C with radiation initiation to a phosphine conversion in excess of 50% to yield the corresponding free radical adducts of anti-Markovnikov orientation.

2. The method of claim 1 wherein x is 1 or 2, R is chlorine, methyl, phenyl, and l is 3 to 12.

3. A method of claim 1 wherein the phosphine is of the formula $R'_2PH$ and the ω-alkenyl silane is of the formula $R_3Si(CH_2)_lCH=CH_2$.

4. A method of claim 1 wherein the phosphine is of the formula $R'PH_2$ and the ω-alkenyl silane is of the formula $R_3Si(CH_2)_lCH=CH_2$.

5. A method for the preparation of silylalkylphosphines comprising the step of selectively reacting phosphines of the general formula:

$$R'_2PH$$

wherein R' is selected from the group of $C_1$ to $C_4$ alkyl, cyclohexyl and phenyl; with ω-alkenyl trichlorosilanes of the formula:

$$Cl_3Si(CH_2)_lCH=CH_2$$

wherein l is 3 to 32; at temperatures between −100° and +16°C with radiation initiation, to a phosphine conversion in excess of 50% to yield the corresponding free radical adducts of anti-Markovnikov orientation.

6. The method of claim 3 wherein l is 3 to 12.

7. A method for preparing ω-trichlorosilyloctyl diphenyl phosphine, said method comprising the step of selectively reacting diphenyl phosphine with ω-trichlorosilyloctene-1 at temperatures between −100° and +16°C with radiation initiation to a phosphine conversion in excess of 50% to produce said compound.

8. A method for the preparation of silylalkyl phosphines comprising the steps of selectively reacting silanes of the formula:

$$R_{4-y}SiH_y$$

wherein R is chlorine, $C_1$ to $C_6$ hydrocarbyl, providing that at least one of the R groups is chlorine; y is 1 and 2; with α,ω-dienes of the formula:

$$CH_2=CH(CH_2)_kCH=CH_2$$

wherein k is 1 to 30; at temperatures between −90° and 90°C using reactant ratios of 2 to 6 moles of diolefin per mole silane to yield ω-alkenyl silanes of the formula:

$$R_{4-y}Si[(CH_2)_lCH=CH_2]_y$$

wherein l is k + 2; and adding a phosphine of the formula:

$$(R'_{3-x}P)H_x$$

wherein R' is selected from the group consisting of $C_1$ to $C_4$ alkyl, cyclohexyl and phenyl; x is 1 to 3; to said ω-alkenyl silane; at temperatures between −100° and +16°C with radiation initiation to a phosphine conversion in excess of 50% to yield the corresponding free radical adducts of anti-Markovnikov orientation.

9. The method of claim 8 wherein R is chlorine, methyl, phenyl; k is 1 to 10; x is 1 or 2.

10. The method of claim 8 wherein the silane is trichlorosilane and the phosphine is of the formula $R'_2PH$ wherein R' is $C_1$ to $C_4$ alkyl.

11. A method for preparing ω-trichlorosilyloctyl diphenyl phosphine, said method comprising the steps of adding trichlorosilane to 1,7-octadiene, at temperatures between −90° and 90°C using reactant ratios of 2 to 6 moles of diolefin per mole silane, to yield 8-octenyl trichlorosilane, adding diphenyl phosphine to said 8-octenyl trichlorosilane to a phosphine conversion in excess of 50% under free radical conditions at temperatures between −100° to +16°C with radiation initiation to produce said final product.

12. Compounds of the formula:

$$(R'_{3-x}P)_z[(CH_2)_m]_ySiR_{4-y}$$

wherein R is chloro, and $C_{1-6}$ hydrocarbyl provided that at least one of the groups is chloro; m is 5 to 30, z is 1 to 3; y is 1 or 2; x is 1 to 3; R' is $C_1$ to $C_4$ alkyl, cyclohexyl and phenyl.

13. Compounds of claim 12 wherein x, y and z are 1.

14. Compounds of claim 12 wherein m is 8 to 30.

15. Compounds of claim 13 wherein R is chloro.

16. Compounds of the formula:

$$R'_2P(CH_2)_mSiR_3$$

wherein R' is $C_1$ to $C_4$ alkyl, cyclohexyl and phenyl, m is 5 to 30, R is chloro, methyl and phenyl, provided that at least one of the R groups is chloro.

17. Compounds of claim 16 wherein m is 8 to 30.

18. Compounds of the formula:

$$R'P[(CH_2)_mSiR_3]_2$$

wherein R' is $C_1$ to $C_4$ alkl, cyclohexyl, phenyl; m is 5 to 30; R is chloro, methyl and phenyl provided that at least one of the R groups is chloro.

19. Compounds of the formula:

$$(R'_{3-x}P)_z[(CH_2)_m]_ySiR_{4-y}$$

wherein R' is $C_1$ to $C_4$ alkyl, cyclohexyl, phenyl; m is 5 to 30; z is 1 to 3; y is 1 or 2; R is chloro.

20. Compounds of claim 19 wherein m is 8 to 30.

21. Compound of the formula:

$$(C_6H_5)_2P(CH_2)_8SiCl_3$$

22. Compound of the formula:

$$(C_6H_5)_2P(CH_2)_8Si(CH_3)Cl_2$$

23. Compound of the formula:

$$(C_6H_5)_2P(CH_2)_{14}SiCl_3$$

24. Compound of the formula:

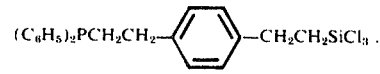

* * * * *